(12) United States Patent
Lee et al.

(10) Patent No.: US 11,722,918 B2
(45) Date of Patent: Aug. 8, 2023

(54) SYSTEMS AND METHODS FOR APERIODIC MEASUREMENT REFERENCE SIGNAL TRANSMISSION IN MULTIPLE ANTENNA SYSTEMS

(71) Applicant: InterDigital Patent Holdings, Inc., Wilmington, DE (US)

(72) Inventors: Moon-il Lee, Melville, NY (US); Janet A. Stern-Berkowitz, Little Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 499 days.

(21) Appl. No.: 16/322,275

(22) PCT Filed: Aug. 10, 2017

(86) PCT No.: PCT/US2017/046224
§ 371 (c)(1),
(2) Date: Jan. 31, 2019

(87) PCT Pub. No.: WO2018/031727
PCT Pub. Date: Feb. 15, 2018

(65) Prior Publication Data
US 2021/0288705 A1 Sep. 16, 2021

Related U.S. Application Data

(60) Provisional application No. 62/373,248, filed on Aug. 10, 2016.

(51) Int. Cl.
*H04B 7/06* (2006.01)
*H04B 17/373* (2015.01)
(Continued)

(52) U.S. Cl.
CPC .......... *H04W 24/10* (2013.01); *H04B 7/0626* (2013.01); *H04B 7/0643* (2013.01);
(Continued)

(58) Field of Classification Search
CPC ... H04B 7/02–12; H04B 17/0082–3913; H04J 11/0023–0093; H04L 5/003–0098;
(Continued)

(56) References Cited

U.S. PATENT DOCUMENTS 9,456,358 B2  9/2016  Chen et al.
9,743,392 B2  8/2017  Nimbalker et al.
(Continued)

FOREIGN PATENT DOCUMENTS

CN  102468922 A  5/2012
CN  103391631 A  11/2013
(Continued)

OTHER PUBLICATIONS

3rd Generation Partnership Project(3GPP), R1-164336, "CSI-RS Overhead Reduction for Beamformed CSI-RS Transmission Schemes", Nokia, Alcatel-Lucent Shanghai Bell, 3GPP TSG RAN WG1 Meeting #85, Nanjing, China, May 23-27, 2016, 3 pages.
(Continued)

*Primary Examiner* — Timothy J Weidner
(74) *Attorney, Agent, or Firm* — Condo Roccia Koptiw LLP

(57) ABSTRACT

Systems and methods are disclosed for determining a first downlink control indicator (DCI) and a second DCI, determining a set of active aperiodic channel state information reference signals (A-CSI-RSs) based on the first DCI, and determining a subset of the set of active A-CSI-RSs based on the second DCI. A WTRU may perform resource element (RE) muting based on a set of active A-CSI-RSs. A WTRU
(Continued)

may perform channel state information (CSI) measurement based on a subset of a set of active A-CSI-RSs.

19 Claims, 8 Drawing Sheets

(51) Int. Cl.

| | |
|---|---|
| *H04B 17/382* | (2015.01) |
| *H04L 5/00* | (2006.01) |
| *H04W 24/08* | (2009.01) |
| *H04W 24/10* | (2009.01) |
| *H04W 84/04* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ......... *H04B 17/373* (2015.01); *H04B 17/382* (2015.01); *H04L 5/0057* (2013.01); *H04L 5/0094* (2013.01); *H04W 24/08* (2013.01); *H04W 84/042* (2013.01); *H04W 88/02* (2013.01); *H04W 88/08* (2013.01); *H04W 92/02* (2013.01); *H04W 92/10* (2013.01)

(58) Field of Classification Search
CPC ... H04W 24/02–10; H04W 72/005–14; H04W 84/02–16; H04W 88/02–10; H04W 92/02; H04W 92/04; H04W 92/10
See application file for complete search history.

(56) References Cited

U.S. PATENT DOCUMENTS

| | | | |
|---|---|---|---|
| 9,854,576 | B2 | 12/2017 | Ouchi et al. |
| 10,129,782 | B2 | 11/2018 | Novlan et al. |
| 10,361,827 | B2 | 7/2019 | Sayana et al. |
| 2013/0208678 | A1 | 8/2013 | Zhang |
| 2014/0044040 | A1* | 2/2014 | Chen ...................... H04L 5/005 |
| 2015/0280878 | A1 | 10/2015 | Lee et al. |
| 2016/0227548 | A1* | 8/2016 | Nimbalker ............ H04L 5/0048 |
| 2018/0205577 | A1* | 7/2018 | Shin ...................... H04L 5/0048 |

FOREIGN PATENT DOCUMENTS

| | | |
|---|---|---|
| CN | 104508997 A | 4/2015 |
| CN | 104584476 A | 4/2015 |
| CN | 107231825 A | 10/2017 |
| EP | 2479918 A1 | 7/2012 |
| JP | 2015-524641 A | 8/2015 |
| WO | 2015/098880 A1 | 7/2015 |
| WO | 2016/114868 A1 | 7/2016 |

OTHER PUBLICATIONS

3rd Generation Partnership Project(3GPP), R1-164858, "Discussion on Efficient Utilization of BF CSI-RS", Huawei, HiSilicon, 3GPP TSG RAN WG1 Meeting #85, Nanjing, China, May 23-27, 2016, 4 pages.
3rd Generation Partnership Project(3GPP), TS 36.211 V11.4.0, "Technical Specification Group Radio Access Network, Evolved Universal Terrestrial Radio Access (E-UTRA), Physical Channels and Modulation (Release 11)", Sep. 2013, 120 pages.
3rd Generation Partnership Project(3GPP), TS 36.212 V11.3.0, "Technical Specification Group Radio Access Network, Evolved Universal Terrestrial Radio Access (E-UTRA), Multiplexing and Channel Coding (Release 11)", Jun. 2013, 84 pages.
3rd Generation Partnership Project(3GPP), TS 36.213 V11.4.0, "Technical Specification Group Radio Access Network, Evolved Universal Terrestrial Radio Access (E-UTRA), Physical Layer Procedures (Release 11)", Sep. 2013, 182 pages.
3rd Generation Partnership Project(3GPP), TS 36.304 V12.1.0, "Technical Specification Group Radio Access Network, Evolved Universal Terrestrial Radio Access (E-UTRA), User Equipment (UE) Procedures in Idle Mode (Release 12)", Jun. 2014, 35 pages.
3rd Generation Partnership Project(3GPP), TS 36.331 V11.4.0, "Technical Specification Group Radio Access Network, Evolved Universal Terrestrial Radio Access (E-UTRA), Radio Resource Control (RRC), Protocol Specification (Release 11)", Jun. 2013, 346 pages.
3rd Generation Partnership Project (3GPP), R1-164217, "On Aperiodic CSI-RS Transmission", CATT, 3GPP TSG RAN WG1 Meeting #85, Nanjing, China, May 23-27, 2016, 3 pages.
3rd Generation Partnership Project (3GPP), R1-124849, "ZP-CSI-RS Configuration for IMRs and PDSCH RE Matching", NEC Group, 3GPP TSG RAN WG1 Meeting #71, New Orleans, USA, Nov. 12-16, 2012, 4 pages.
3rd Generation Partnership Project (3GPP), R1-153134, "Further Discussion on CSI Measurement and Reporting for LAA", Ericsson, 3GPP TSG RAN WG1 Meeting #81, Fukuoka, Japan, May 25-29, 2015, 5 pages.
3rd Generation Partnership Project (3GPP), R1-154159, "Discussion on NZP CSI-RS Resource Configuration for 12 and 16 Ports", Samsung, 3GPP TSG RAN WG1 Meeting #82, Beijing, China, Aug. 24-28, 2015, pp. 1-4.
3rd Generation Partnership Project (3GPP), R1-154513, "Discussion on CSI Feedback for LAA", Lenovo, 3GPP TSG RAN WG1 Meeting #82, Beijing, China, Aug. 24-28, 2015, 3 pages.
3rd Generation Partnership Project (3GPP), R1-155264, "Specification Impacts on Beamformed CSI-RS Configuration", ZTE, 3GPP TSG RAN WG1 Meeting #28bis, Malmo, Sweden, Oct. 5-9, 2015, 6 pages.
3rd Generation Partnership Project (3GPP), R1-155483, "NZP CSI-RS Configuration and RE Mapping for Class A CSI Reporting", Samsung, 3GPP TSG RAN WG1 Meeting #82bis, Malmo, Sweden, Oct. 5-9, 2015, pp. 1-8.
3rd Generation Partnership Project (3GPP), R1-162969, "Discussion on Aperiodic CSI-RS", NTT DoCoMo, 3GPP TSG RAN WG1 Meeting #84bis, Busan, Korea, Apr. 11-15, 2016, pp. 1-3.
3rd Generation Partnership Project (3GPP), R1-164428, "Enhancements on Beamformed CSI-RS for eFD-MIMO", Qualcomm Incorporated, 3GPP TSG-RAN WG1 Meeting #85, Nanjing, China, May 23-27, 2016, pp. 1-5.
3rd Generation Partnership Project (3GPP), R1-165585, "WF on Beamformed CSI-RS Enhancements", LG Electronics, Samsung, Qualcomm, 3GPP TSG RAN WG1 Meeting #85, Nanjing, China, May 23-27, 2016, pp. 1-4.
3rd Generation Partnership Project (3GPP), R2-110607, "Higher Layer Signaling of CSI-RS and Muting Configurations", NTT DoCoMo, Ericsson, ST-Ericsson, 3GPP TSG-RAN WG2 Meeting #72bis, Dublin, Ireland, Jan. 17-21, 2011, pp. 1-3.
Gao, Wei-Juan, "Research on Key Technology of Coordinated Multipoint Transmission", China Master's Theses Full-Text Database (CMFD), Aug. 15, 2015, 62 pages.
Sawahashi et al., "CSI Reference Signal Multiplexing Using Carrier Frequency Swapping for FDD High-Order MIMO SDM", 2014 IEEE 80th Vehicular Technology Conference (VTC2014-Fall), Dec. 4, 2014, 5 pages.
3rd Generation Partnership Project (3GPP), R1-125001, "Remaining Details of PDSCH Rate Matching Behavior in Relation to ZP CSI-RS Resources, IMRs and NZP CSI-RS Resources", Nokia Siemens Networks, Nokia, 3GPP TSG-RAN WG1 Meeting #71, New Orleans, U.S., Nov. 12-16, 2012, 3 pages.
3rd Generation Partnership Project, TS 36.211 V13.2.0, "Technical Specification Group Radio Access Network, Evolved Universal Terrestrial Radio Access (E-UTRA), Physical channels and modulation (Release 13)", Jun. 2016, pp. 1-168.
3rd Generation Partnership Project, TS 36.214 V13.2.0, "Technical Specification Group Radio Access Network, Evolved Universal Terrestrial Radio Access (E-UTRA), Physical Layer, Measurements (Release 13)", Jun. 2016, pp. 1-19.

(56) References Cited

OTHER PUBLICATIONS

3rd Generation Partnership Project (3GPP), R1-1707608, "Discussion on Interference Measurement and Rate Matching for NR", LG Electronics, 3GPP TSG RAN WG1 Meeting #89, Hangzhou, P.R. China, May 15-19, 2017, 6 pages.

3rd Generation Partnership Project (3GPP), R1-166841, "Remaining Details on Beamformed CSI-RS Enhancements", LG Electronics, 3GPP TSG RAN WG1 Meeting #86, Gothenburg, Sweden, Aug. 22-26, 2016, 5 pages.

* cited by examiner

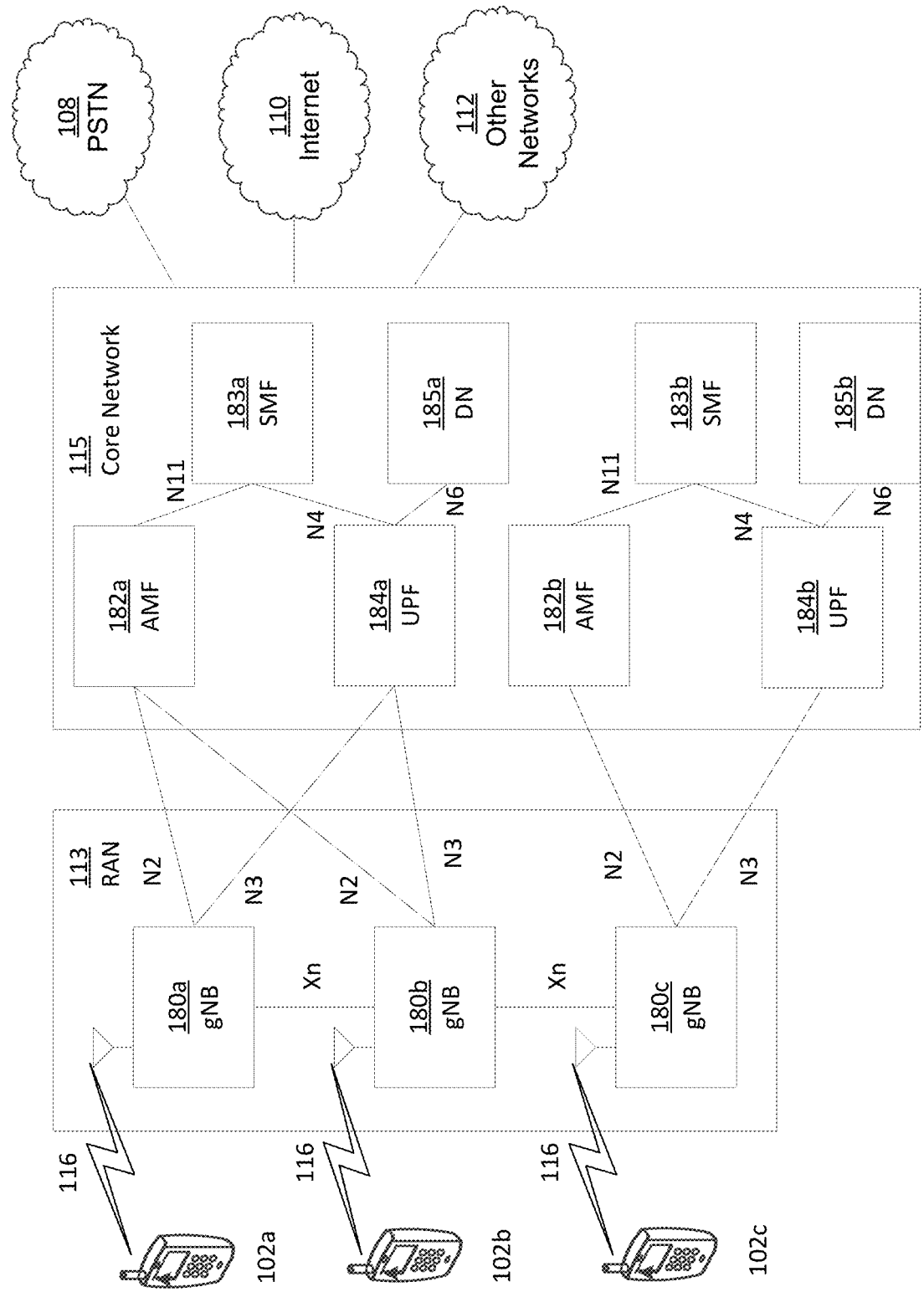

SYSTEMS AND METHODS FOR APERIODIC MEASUREMENT REFERENCE SIGNAL TRANSMISSION IN MULTIPLE ANTENNA SYSTEMS

CROSS-REFERENCE TO RELATED APPLICATIONS

This application is the National Stage entry under 35 U.S.C. § 371 of Patent Cooperation Treaty Application PCT/US2017/046224, filed Aug. 10, 2017, entitled "SYSTEMS AND METHODS FOR APERIODIC MEASUREMENT REFERENCE SIGNAL TRANSMISSION IN MULTIPLE ANTENNA SYSTEMS," which claims priority to U.S. Provisional Patent Application Ser. No. 62/373,248, filed Aug. 10, 2016, entitled "SYSTEMS AND METHODS FOR APERIODIC MEASUREMENT REFERENCE SIGNAL TRANSMISSION IN MULTIPLE ANTENNA SYSTEMS," which is incorporated herein by reference in its entirety.

BACKGROUND

A channel state information reference signal (CSI-RS) may be used for measurement purposes in Long-Term Evolution (LTE) wireless communications systems. One or more patterns of CSI-RSs may be a function of a number of antenna ports that may be in use by a device generating such patterns. Such patterns may be provided in a transmission subframe.

SUMMARY

The Summary is provided to introduce a selection of concepts in a simplified form that are further described below in the Detailed Description. This Summary is not intended to identify key features and/or essential features of the claimed subject matter, nor is it intended to be used to limit the scope of the claimed subject matter.

Systems and methods are disclosed for determining a first downlink control indicator (DCI) and a second DCI, determining a set of active aperiodic channel state information reference signals (A-CSI-RSs) based on the first DCI, and determining a subset of the set of active A-CSI-RSs based on the second DCI. Resource element (RE) muting may be performed based on a set of active A-CSI-RSs. Channel state information (CSI) measurement may be performed based on a subset of a set of active A-CSI-RSs. RE muting as disclosed herein may be puncturing or rate-matching around REs of a set of active A-CSI-RSs in order to receive a physical downlink shared channel (PDSCH) transmission. Systems and methods are further disclosed for determining at least one A-CSI-RS pattern based on a subset of a set of active A-CSI-RSs, where such at least one A-CSI-RS pattern may be associated with a WTRU.

Systems and methods are disclosed for performing CSI measurement(s) based on a subset of a set of active A-CSI-RSs by performing the CSI measurement(s) based on at least one A-CSI-RS pattern. Performing RE muting based on a set of active A-CSI-RSs may include performing muting of at least one downlink transmission. A physical downlink control channel (PDCCH) common search space (CSS) may be monitored for detection of a DCI that may be received via such a PDCCH CSS. An enhanced physical downlink control channel (EPDCCH) common search space (CSS) may be monitored for detection of a DCI that may be received via such a EPDCCH CSS.

Systems and methods are disclosed for performing monitoring a WTRU-specific search space and determining a DCI based on the WTRU-specific search space. Determining a flag bit based on a DCI may be performed, where such a flag bit may indicate whether the DCI includes a subset of a set of active A-CSI-RSs. RE muting may be performed based on at least one of a time or a frequency location.

BRIEF DESCRIPTION OF THE DRAWINGS

The following detailed description of example examples is provided with reference to the appended drawings. For the purposes of illustration, the drawings show example examples. The contemplated subject matter is not limited to the specific elements and/or instrumentalities described or illustrated. Absent specific notation to the contrary, no subject matter is contemplated as necessary and/or essential. In addition, the described examples may be employed in any combination, in whole or in part. In the drawings:

FIG. 1D is a system diagram illustrating a further example RAN and a further example CN that may be used within the communications system illustrated in FIG. 1A according to an example.

DETAILED DESCRIPTION

A detailed description of example examples will now be described with reference to the various figures. Although this description provides a detailed example of possible implementations, it should be noted that the details are intended to be examples and in no way limit the scope of the application. As used herein, the article "a" or "an," absent further qualification or characterization, may be understood to mean "one or more" or "at least one," for example. Also, as used herein, the phrase "user equipment" (UE) may be understood to mean the same thing as the phrase "wireless transmit/receive unit" (WTRU).

Figure 1A:
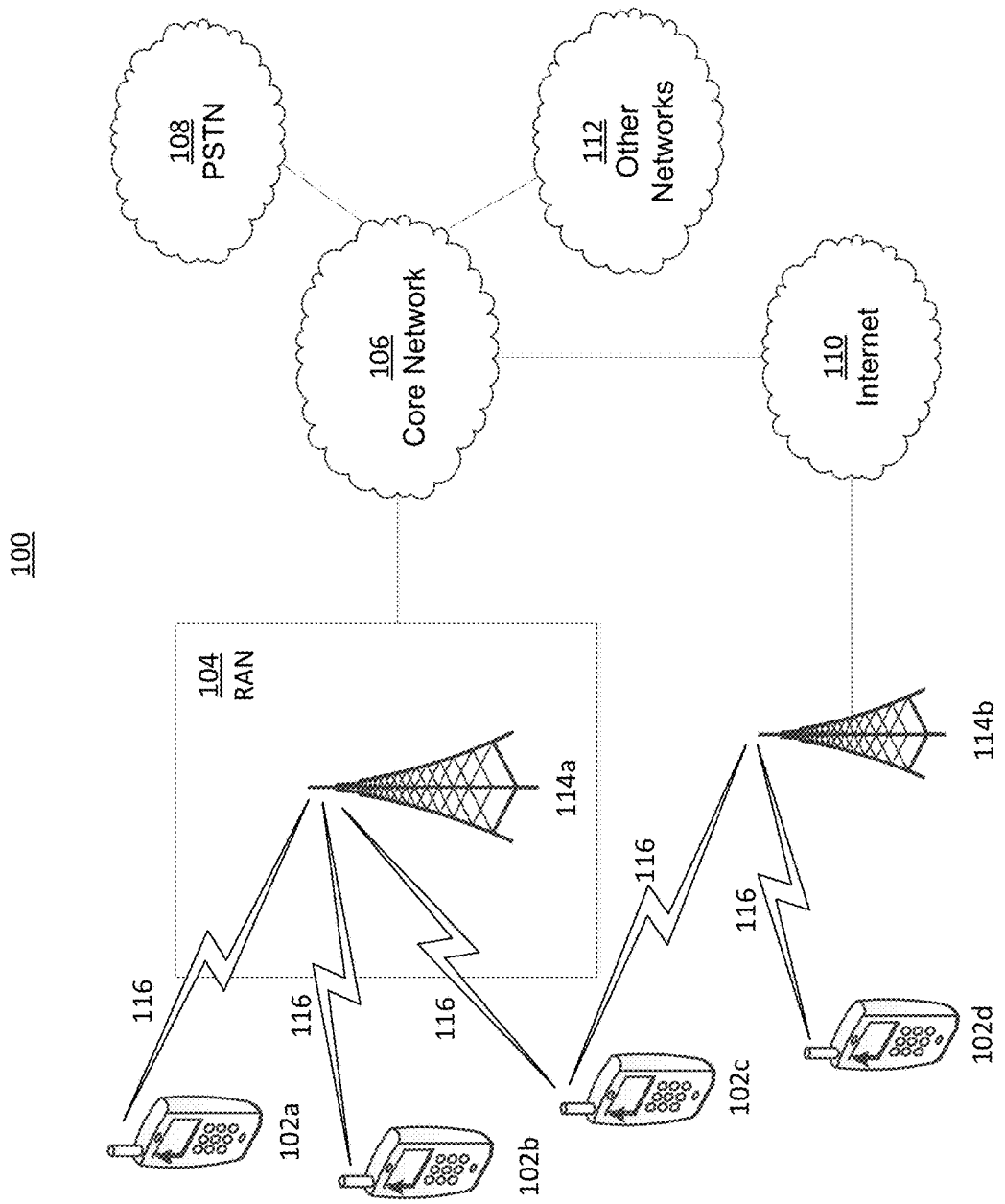
FIG. 1A is a system diagram of an example communications system in which one or more disclosed examples may be implemented.

FIG. 1A is a diagram illustrating an example communications system 100 in which one or more disclosed examples may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed examples contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one example, the base station 114a may include three transceivers, i.e., one for each sector of the cell. In an example, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an example, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an example, the base station 114a and the WTRUs 102a, 102b, 102c may implement a radio technology such as NR Radio Access, which may establish the air interface 116 using New Radio (NR).

In an example, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other examples, the base station 114a and the WTRUs 102a, 102b, 102c may implement radio technologies such as IEEE 802.11 (e.g., Wireless Fidelity (WiFi), IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one example, the base station 114b and the WTRUs 102c, 102d may implement a radio technology such as IEEE 802.11 to establish a wireless local area network (WLAN). In an example, the base station 114b and the WTRUs 102c, 102d may implement a radio technology such as IEEE 802.15 to establish a wireless personal area network (WPAN). In yet another example, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
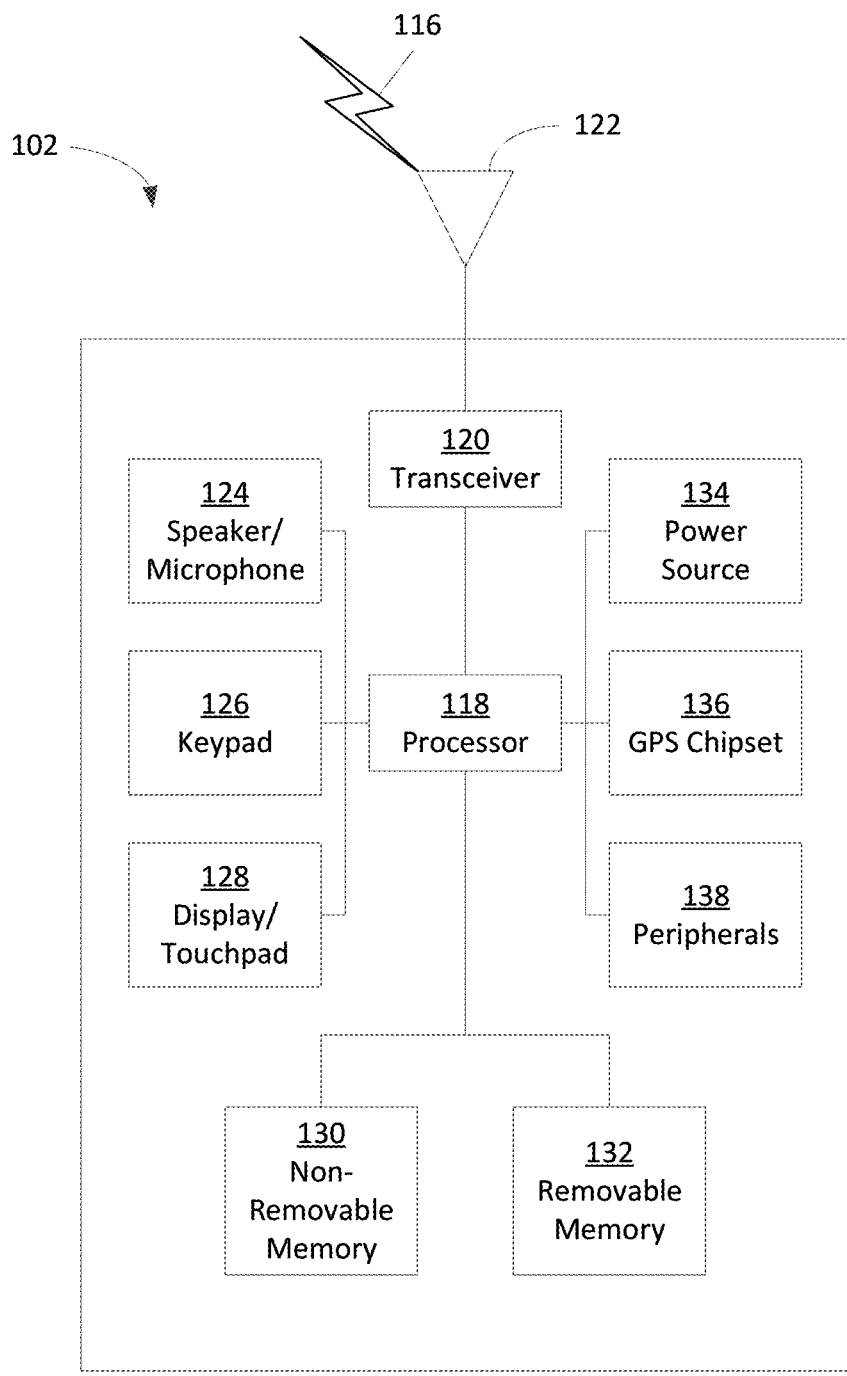
FIG. 1B is a system diagram of an example wireless transmit/receive unit (WTRU) that may be used within the communications system illustrated in FIG. 1A according to an example.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an example.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in an example, the transmit/receive element 122 may be an antenna configured to transmit and/or receive RF signals. In an example, the transmit/receive element 122 may be an emitter/detector configured to transmit and/or receive IR, UV, or visible light signals, for example. In yet another example, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one example, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other examples, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an example.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an example, the WTRU 102 may include a half-duplex radio for which transmission and reception of some or all of the signals (e.g., associated with particular subframes for either the UL (e.g., for transmission) or the downlink (e.g., for reception)).

Figure 1C:
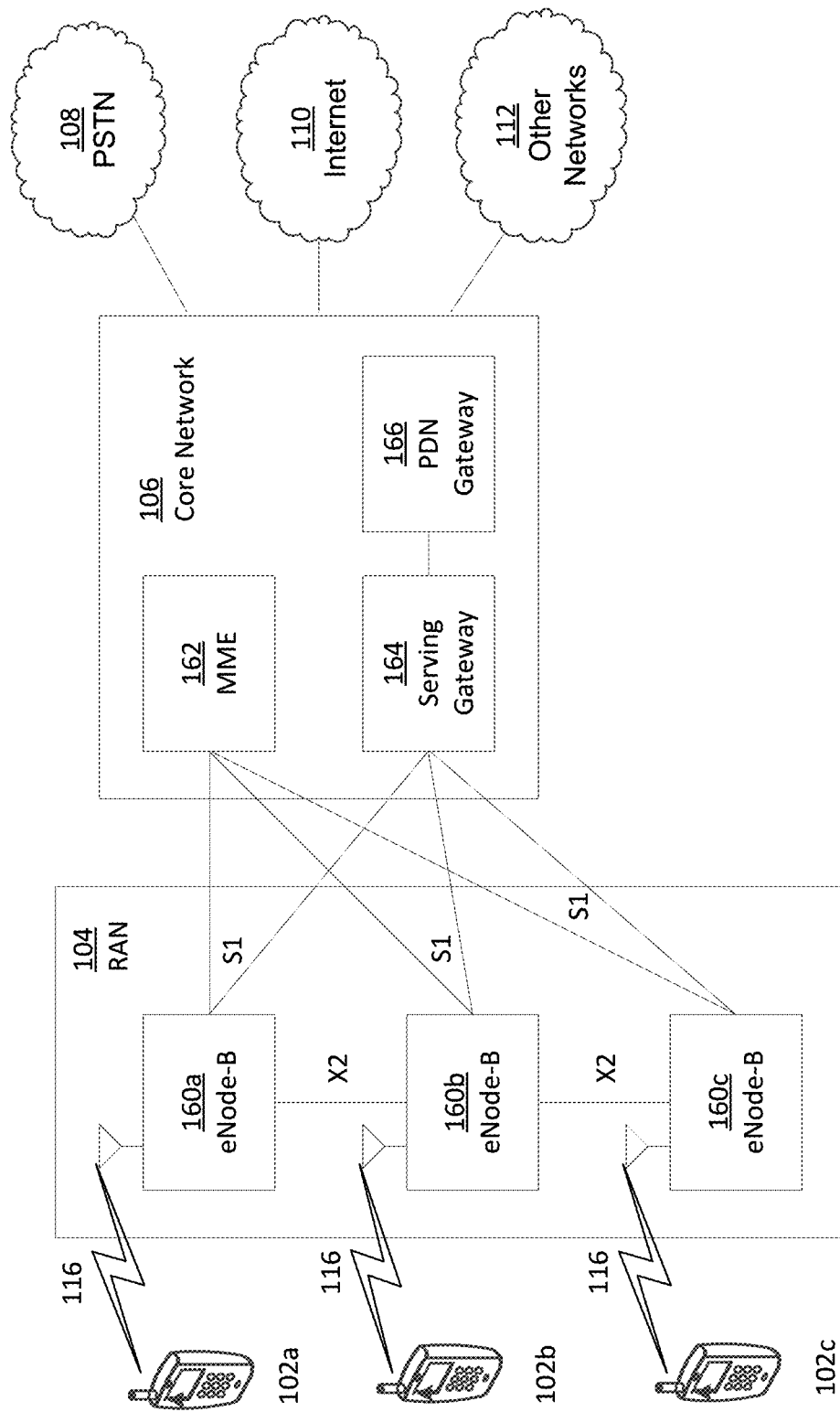
FIG. 1C is a system diagram illustrating an example radio access network (RAN) and an example core network (CN) that may be used within the communications system illustrated in FIG. 1A according to an example.

FIG. 1C is a system diagram illustrating the RAN 104 and the CN 106 according to an example. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an example. The eNode-Bs 160a, 160b, 160c may each include one or more transceivers for communicating with the WTRUs 102a, 102b, 102c over the air interface 116. In one example, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative examples that such a terminal may use (e.g., temporarily or permanently) wired communication interfaces with the communication network.

In representative examples, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative examples, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative examples, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative example, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 113 and the CN 115 according to an example. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an example. The gNBs 180a, 180b, 180c may each include one or more transceivers for communicating with the WTRUs 102a, 102b, 102c over the air interface 116. In one example, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an example, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an example, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one example, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A WTRU may use one or more channel state information reference signals (CSI-RSs) in order to perform measurements. A CSI-RS may be transmitted using a wideband (e.g., across the system bandwidth) with a duty cycle (e.g., 5, 10, 20, 40, 80 ms) that may be in a Physical Downlink Shared Channel (PDSCH) region. A number of CSI-RS patterns (e.g., 20 CSI-RS patterns, less than 20 CSI-RS patterns, more than 20 CSI-RS patterns) may be available in a subframe. A CSI-RS pattern may be a CSI-RS reuse pattern. A CSI-RS pattern may be a function a number of antenna ports that may be in use at a transmitting device.

Figure 2:
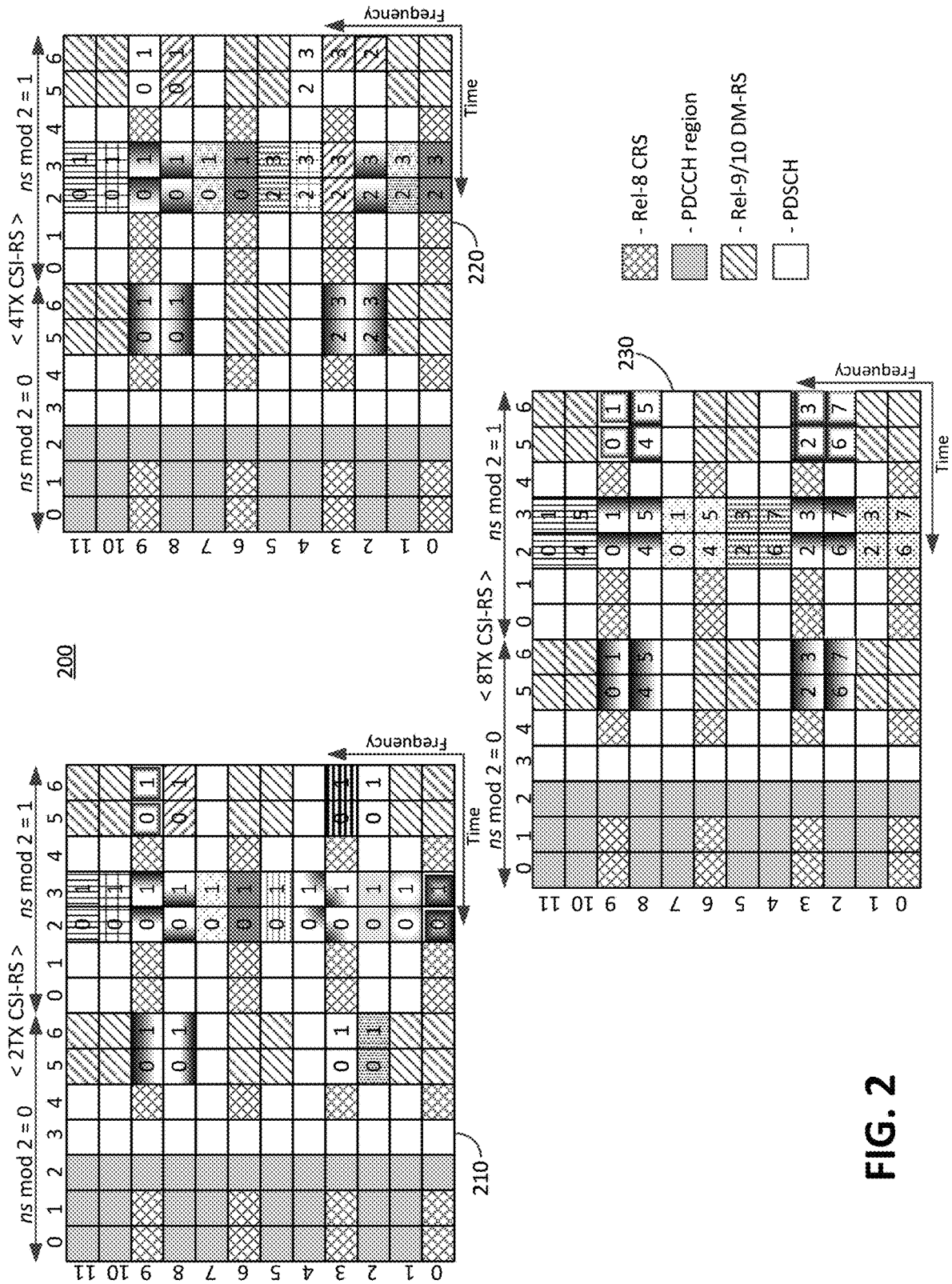
FIG. 2 is a diagram illustrating exemplary reference signals according to an example.

FIG. 2 illustrates diagrams 200 that include exemplary representations of reference signals (RSs) 210, 220, 230. RSs 210, 220, 230 may include CSI-RS patterns that may be based on a number of antenna ports that may be used for transmission. In FIG. 2, a same indication (e.g., same shading illustrated in FIG. 2) of one or more resource elements (REs) in each illustrated RS may indicate a set of one or more REs that may be associated with a CSI-RS configuration and/or a CSI-RS pattern. Note that in the instant disclosure, CSI-RS pattern, CSI-RS reuse pattern, CSI-RS pattern reuse, and CSI-RS configuration may be used interchangeably.

In FIG. 2, example CSI-RS patterns for each of 2 (e.g., RS 210), 4 (e.g., RS 220), and 8 (e.g., RS 230) antenna ports are shown. One or more CSI-RS reuse patterns of such 2, 4, and 8 antenna ports may be aggregated to form a CSI-RS pattern, for example, where more than 8 antenna ports may be used.

CSI-RS configurations may refer to the configuration of one or more reference signals to be transmitted for purposes of CSI measurements. The examples described herein may be set forth in terms of a WTRU receiving a CSI-RS configuration that define one or more reference signals to be transmitted by the WTRU in the uplink; however, the WTRU may also receive a CSI-RS configuration that defines one or more reference signals to be received in the downlink. For example, the WTRU may receive a first CSI-RS configuration that defines one or more CSI-RSs (e.g., time/frequency location, power level, periodicity, frequency hopping pattern, code, etc.). The WTRU may then transmit the CSI-RS(s) in accordance with the configuration, for example either periodically and/or aperiodically based on a trigger. The trigger may indicate which portions of the CSI configuration is applicable to a given aperiodic CSI-RS transmission. For example, the trigger (e.g., DCI) may indicate whether the CSI-RS are to be transmitted using a non-zero power RS or with a zero-power CSI RS (e.g., muting is to be performed).

In an example of the WTRU receiving a downlink CSI-RS, the WTRU may receive a second CSI-RS configuration that defines one or more CSI-RSs (e.g., time/frequency location, power level, periodicity, frequency hopping pattern, code, etc.). The WTRU may then receive the CSI-RS(s) in accordance with the configuration, for example either periodically and/or aperiodically based on a trigger. The trigger may indicate which portions of the CSI configuration is applicable to a given aperiodic CSI-RS transmission. For example, the trigger (e.g., DCI) may indicate whether the CSI-RS are to be received in accordance with a first CSI-RS pattern or in accordance with a second CSI-RS pattern.

In an example, the WTRU receive a CSI-RS configuration that defines a plurality of possible CSI-RS transmissions, for example CSI-RS downlink transmissions. In some subframes, each of the possible CSI-RS transmissions may be performed, for example by the eNB transmitting the CSI-RS transmissions in accordance with the CSI-RS configuration. A DCI may be used to indicate to the WTRU that the eNB will be transmitting the CSI-RS transmissions in accordance with the CSI-RS configuration in that subframe. In an example, not all of the CSI-RS transmissions to be sent by the WTRU may be applicable to the WTRU or otherwise may not be measured by the WTRU. For example, a first DCI may be used to indicate a plurality of CSI-RSs that are active for a subframe. A second DCI may indicate a subset of the plurality of CSI-RSs that are active and that should be measure by the WTRU. The WTRU may use the first and second DCIs to determine which of the plurality of CSI-RSs should be measured (e.g., the indicated subset) and which of the plurality of CSI-RSs should be muted (e.g., the active set minus the indicated subset). The WTRU may performing muting of the REs that include active CSI-RSs that are not being measured by the WTRU by performing rate matching and/or other techniques described herein for those resource elements. The rate matching may be performed in order to receive a PDSCH transmission that includes that resource elements to be muted.

Note that, as used herein, "DCI" may refer to "downlink control indicator" or "downlink control information." "Downlink control indicator," "downlink control information," and "DCI" may be used interchangeably herein.

One or more channels and/or channel types may be used for reporting CSI feedback. For example, either or both of a Physical Uplink Control Channel (PUCCH) or a Physical Uplink Shared Channel (PUSCH) may be used for reporting CSI feedback. A PUCCH channel may, for example, provide CSI feedback while, e.g., utilizing limited feedback overhead. A PUSCH channel may, for example, provide a relatively large amount of feedback overhead while, e.g., providing relatively lower reliability. A PUCCH channel may be used for periodic CSI feedback, for example, where coarse link adaptation may be in use. A PUSCH channel may be used upon a triggering of aperiodic CSI reporting, for example, where finer link adaptation may be in use.

CSI feedback may include (e.g., may be reported in a format that may include) at least one of a rank indicator (RI), a precoder matrix index (PMI), and a channel quality indicator (CQI). An RI and/or a PMI may be calculated at a WTRU receiver, for example, by such a WTRU selecting a rank and/or a precoding matrix (e.g., from a predefined codebook) that may increase WTRU throughput. A PMI and/or a CQI may be assigned to and/or reported as associated with one or more categories, such as wideband, subband, and a WTRU-selected subband. An RI may (e.g., may only) be reported using wideband. Table 1 illustrates example scheduling modes that may be associated with PUCCH and/or PUSCH. Table 2 illustrates example values that may be used for CSI feedback according to a transmission mode and/or a reporting mode (e.g., periodic or aperiodic).

TABLE 1

Reporting modes in LTE and/or LTE-A

| Scheduling Mode | Periodic CSI reporting channels | Aperiodic CSI reporting channel |
|---|---|---|
| Frequency non-selective | PUCCH | |
| Frequency selective | PUCCH | PUSCH |

TABLE 2

CSI feedback information according to reporting modes

| Transmission Mode | Aperiodic Feedback | Periodic Feedback |
|---|---|---|
| 1 | Mode 2-0: WTRU selected sub band CQI: WB CQI + CQI over M best subbands | Mode 1-0: WB CQI |
| 2 | | Mode 2-0: WTRU Selected sub band CQI: WB CQI + WTRU reports CQI in preferred subband in each BW part, one BW part in each reporting opportunity |
| 3 | | |
| 7 | Mode 3-0: high layer (HL) configured subband CQI: WB CQI + subband CQI | |
| 8 | | |
| | Notes: CQI for first CW only, No PMI | Notes: CQI for first CW only, No PMI |
| 4 | Mode 1-2: WB CQI/Multiple PMI: CQI for each CW; PMI for each subband | Mode 1-1: WB CQI/Single PMI |
| 6 | | Mode 2-1: WTRU selected subband CQI/Single PMI ($N_{RB}^{DL} > 7$ only): WB CQI/PMI + WTRU reports CQI in preferred subband in each BW part |
| 8 | Mode 2-2: WTRU selected sub band CQI/Multiple PMI: CQI per CW and PMI, both over full BW and M best subbands | |
| | Mode 3-1: HL configured sub band CQI/Single PMI: WB CQI + subband CQI, both per CW | |
| 5 | Mode 3-1: HL configured sub band CQI/Single PMI (see above) | |

Periodic and/or aperiodic feedback (e.g., CSI feedback) may be transmitted on a PUCCH channel. Periodic and/or aperiodic feedback may also, or instead, be transmitted on a PUSCH channel, for example, when a PUSCH channel allocation has been provided to the WTRU and/or is otherwise available.

Periodic reporting may use one or more types of reports and/or one or more sequences of one or more types of reports. A report type may be one or more of, for example, report type 1 (e.g., that may be associated with subband CQI), report type 2 (e.g., that may be associated with wideband CQI/PMI), report type 3 (e.g., that may be associated with RI) and/or report type 4 (e.g., that may be associated with wideband CQI).

Aperiodic CSI (e.g., CSI feedback) may be requested, for example, by an uplink grant (e.g., downlink control indicator (DCI) format 0, DCI format 4). Aperiodic CSI (e.g., CSI feedback) may be requested, for example, when a CQI Request bit may be set in an associated DCI. Aperiodic CSI (e.g., CSI feedback) may be transmitted, for example, on a PUSCH.

A CSI report type (e.g., a periodic CSI report type) may include one or more of report types, for example, when eight (8) transmit (Tx) antenna ports may be used. Such report types may include one or more of a type 1 report (e.g., that may support CQI feedback for WTRU selected sub-bands) and a type 1a report (e.g., that may support subband CQI and/or second PMI feedback). Such report types may also, or instead, include one or more of a type 2, type 2b, and/or a type 2c reports (e.g., each of which may support wideband CQI and/or PMI feedback). Such report types may also, or instead, include one or more of a type 2a report (e.g., that may support wideband PMI feedback), a type 3 report (e.g., that may support RI feedback), a type 4 report (e.g., that may support wideband CQI), a type 5 report (e.g., that may support RI and/or wideband PMI feedback), and a type 6 report (e.g., that may support RI and/or PTI feedback).

An exemplary type 6 report may include and/or use a precoding type indicator (PTI) for eight (8) transmit antenna ports, for example, where an 8Tx (eight transmit ports) precoder may be defined with a dual codebook.

RE muting may be used, for example, to avoid a collision of signals. Where RE muting may be used, puncturing and/or rate-matching may be used, for example, from a coding chain perspective. Where puncturing may be used, a signal that may be mapped to a punctured RE may not be transmitted and/or may be transmitted at zero (0) power in such a punctured RE. Where rate-matching may be used, a mapping of one or more signals to one or more REs may help avoid mapping to one or more particular REs, which may, for example, result in other signals not being transmitted.

An N-bit coded bit sequence for a channel, for example $(c_1, \ldots, c_N)$, may be an output of a channel encoder that may have a payload and/or information as an input. Such a channel encoder may use any channel code, such as turbo code, convolutional code, Reed-Muller code, etc. Such a coded bit sequence may be an input to a mapper.

An M-symbol modulated symbol sequence, for example $(x_1, \ldots, x_M)$, may be an output of a mapper where a coded bit sequence may be modulated according to a modulation scheme (e.g., binary phase-shift keying (BPSK), quadrature phase-shift keying (QPSK), 16 quadrature amplitude modulation (16QAM), 64 quadrature amplitude modulation (64QAM)). A modulated symbol sequence of length M may be equal to or smaller than N, for example, based on a modulation scheme that may be used.

A modulated symbol sequence may be mapped to a set of one or more REs for a channel, for example, according to a predefined order. For example, $x_1, \ldots, x_M$ may be mapped onto M REs that may be used for a channel in a certain order, e.g., a predefined order. If a k-th (e.g., where k≤M) RE may be muted (e.g., due to a collision), puncturing may indicate that a modulated symbol $x_k$ may not be transmitted. Rate-matching may indicate that a mapping may skip one or more REs that may be muted and/or that fewer modulated symbols may be mapped.

M-1 modulated symbol(s) may be mapped and/or transmitted for one or more rate-matched REs. For example, $x_1, \ldots, x_M$ may be transmitted and a last modulated symbol may not be transmitted based on a muting of the k-th RE. Puncturing may lose coded bits in positions of muted REs. Rate-matching may lose coded bits from last coded bits.

RE muting with puncturing may be referred to as "RE puncturing" herein. RE muting with rate-matching may be referred to as "RE rate-matching" herein. As used herein, RE muting may include either or both of RE puncturing and RE rate-matching.

RE muting (e.g., in an LTE system) may be performed, for example, to avoid a collision between signals of different types in a same direction. For example, in a downlink (DL), PDSCH REs may be muted to avoid a collision with one or more CSI-RSs and/or one or more positioning reference signal (PRS) REs. Such CSI-RSs and/or PRS REs may be muted to avoid a collision with a primary synchronization signal (PSS) and/or a secondary synchronization signal (SSS). An uplink channel (UL) that may use PUSCH and/or PUCCH may be shortened in an effort to avoid a collision with a sounding reference signal (SRS) in the UL.

An Enhanced Physical Downlink Control Channel (EPDCCH) may be used to achieve frequency domain inter-cell interference coordination (ICIC) and/or beamforming gain. EPDCCH, ePDCCH, and E-PDCCH may be used interchangeably herein. Enhanced Resource Element Group (EREG) and Enhanced Control Channel Element (ECCE) may be used interchangeably herein, and may also be referred to as eREG and eCCE, respectively. For example, since a plurality of EREGs may be used to form an ECCE, the EPDCCH resources may be equivalently described either in terms of EREGs or ECCEs EPDCCH resources for a WTRU-specific search space may be configured with a subset of physical resource blocks (PRBs) in a PDSCH region. EPDCCH resources may be configured in a WTRU-specific manner. EPDCCH resource sets (e.g., up to two EPDCCH resource sets) may be configured for a WTRU. An EPDCCH resource set may be configured with 2, 4, or 8 PRB-pairs. An EPDCCH resource set may be determined as a localized resource set and/or a distributed resource set.

One or more PRB-pairs may be configured as an EPDCCH resource. In each such PRB-pair, a number of EREGs may be defined. For example, sixteen (16) EREGs may be defined for each such PRB-pair, for example, regardless of associated Cyclic Prefix (CP) length (e.g., normal CP, extended CP).

Figure 3:
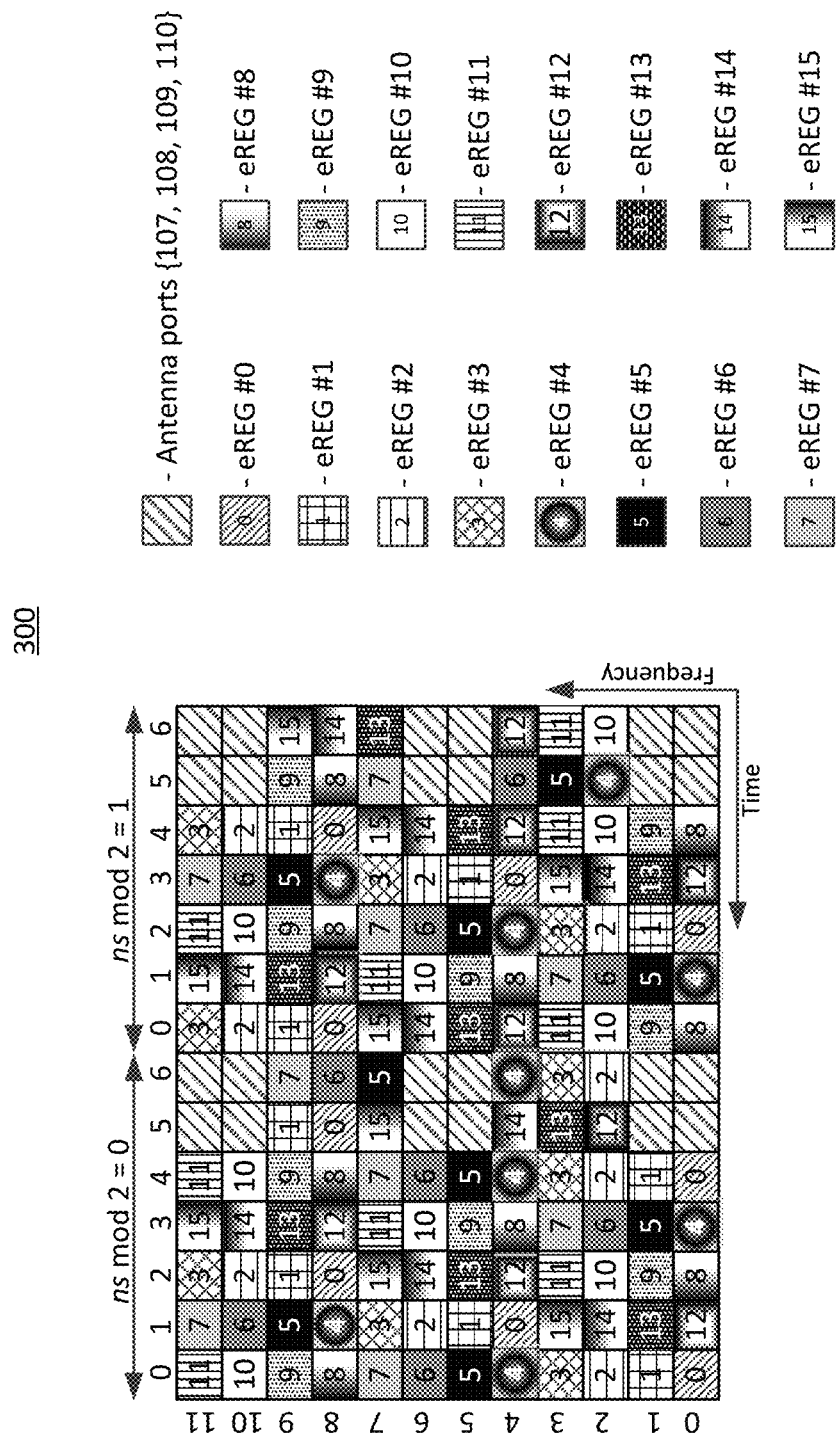
FIG. 3 is a diagram illustrating exemplary Enhanced Resource Element Groups (EREG) according to an example.

FIG. 3 illustrates exemplary eREG definitions 300 of a PRB-pair in a CP subframe. REs for such an eREG may be allocated cyclically in a frequency first manner and/or may be rate-matched based on a demodulation reference signal (DM-RS) (e.g., antenna ports 307, 308, 309, 310 shown in FIG. 3). This may result in randomizing channel estimation performance across eREGs as channel estimation performance may be different according to an RE's location in a PRB-pair.

An ECCE may be defined by, for example, a grouping of four (4) or eight (8) EREGs that may be within an EPDCCH resource set. A total number of ECCEs (may be indicated as $N_{eCCE,set}$) in an EPDCCH resource set may be determined as a function of a number of PRB pairs (may be indicated as $N_{PRB,set}$) that may be configured for such an EPDCCH resource set and/or a number of EREGs that may be grouped for an ECCE (may be indicated as $N_{eREG}$). For example, $N_{eCCE,set}=16\times N_{PRB,set}/N_{eREG}$. EREGs for an ECCE may be mutually exclusive for EREGs that may be associated with another ECCE.

Two or more types of ECCEs may be determined based on an operation mode of an EPDCCH resource set (e.g., localized mode of operation, distributed mode of operation). An ECCE for a localized mode of operation may be referred to as a localized ECCE (L-ECCE). An ECCE for a distributed mode of operation may be referred to as a distributed ECCE (D-ECCE).

To form an L-ECCE, multiple EREGs (e.g., four (4) or eight (8) EREGs) that may be located in a same PRB-pair may be grouped together.

EREGs in different PRB-pairs may be grouped to form a D-ECCE.

EREGs in an EPDCCH resource set may be used to form an L-ECCE and/or a D-ECCE based on an operation mode of the EPDCCH that may be configured for an associated EPDCCH resource set. For example, an EPDCCH resource set may be configured with a localized operation mode (e.g., localized EPDCCH). EREGs in such an EPDCCH resource set may be used to form L-ECCEs. An EPDCCH resource set may include ECCEs that may be either L-ECCEs or D-ECCEs.

Table 3 illustrates exemplary numbers of EREGs that may be grouped to form an ECCE based on exemplary subframe configurations. For example, four (4) EREGs may be grouped to form an ECCE, e.g., for a normal subframe and/or a special subframe configuration 3, 4, 8 in time division duplexing TDD where sufficient numbers of REs may be available per ECCE such that a particular effective coding rate may be used.

Table 3 further illustrates exemplary number of eight (8) EREGs that may be grouped to form an ECCE, e.g., for a normal subframe and/or a special subframe configuration 1, 2, 6, 7, 9 and/or a special subframe configuration 1, 2, 3, 5, 6 in time division duplexing TDD, where sufficient numbers of REs may be available per ECCE such that a particular effective coding rate may be used.

TABLE 3

Example numbers of grouped EREGs per ECCE

| Normal cyclic prefix | | Extended cyclic prefix | |
| --- | --- | --- | --- |
| Normal subframe | Special subframe, configuration 3, 4, 8 | Special subframe, configuration 1, 2, 6, 7, 9 | Normal subframe | Special subframe, configuration 1, 2, 3, 5, 6 |
| Number of grouped EREGs: 4 | | Number of grouped EREGs: 8 | |

A WTRU-specific search space may be used with EPDCCH. Common search space may be located (e.g., always located) at a PDCCH region. WTRU monitoring behavior for downlink control signaling reception may be defined in a downlink subframe as a WTRU monitoring WTRU-specific search space in EPDCCH and common search space in PDCCH, where a EPDCCH monitoring subframe may be configured via higher layer signaling. WTRU monitoring behavior for downlink control signaling reception may also, or instead, be defined in a downlink subframe as a WTRU monitoring both WTRU-specific search space and common search space in PDCCH. Where a subframe may be configured to monitor an EPDCCH subframe, if EPDCCH may not be available in such a subframe due to, for example, collisions between EPDCCH REs and other signals, a WTRU-specific search space fallback may be used so that a WTRU may monitor PDCCH for WTRU-specific search space.

Table 4 illustrates exemplary EPDCCH formats in terms of aggregation levels (e.g., $N_{ECCE}$) that may be a function of a number of available REs ($n_{EPDCCH}$) for EPDCCH in a PRB-pair. Where an available number of REs may be less than a threshold (e.g., $n_{EPDCCH}<104$), an aggregation level may increase in an effort to maintain a similar effective coding rate. For example, one or more supportable EPDCCH formats that may be used for localized transmission where $n_{EPDCCH}<104$ may be $N_{ECCE} \in \{2,4,8,16\}$, while $N_{ECCE} \in \{1,2,4,8\}$ may be used in other cases (e.g., where $n_{EPDCCH} \geq 104$). A set of aggregation levels may be based on EPDCCH transmission modes.

TABLE 4

Examples of supported EPDCCH formats

| | $N_{ECCE}$ | | | |
|---|---|---|---|---|
| | Normal subframes and special subframes, configuration 3, 4, 8, with $n_{EPDCCH} < 104$ and using normal cyclic prefix | | All other cases | |
| EPDCCH format | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

EPDCCH REs may be defined as REs in a PRB-pair. EPDCCH REs may be REs that may not be occupied by antenna ports such as antenna ports {407, 408, 409, 410} shown in FIG. 4 as components of example EPDCCH RE definitions 420 and 430 illustrated in block diagram 400.

Figure 4:
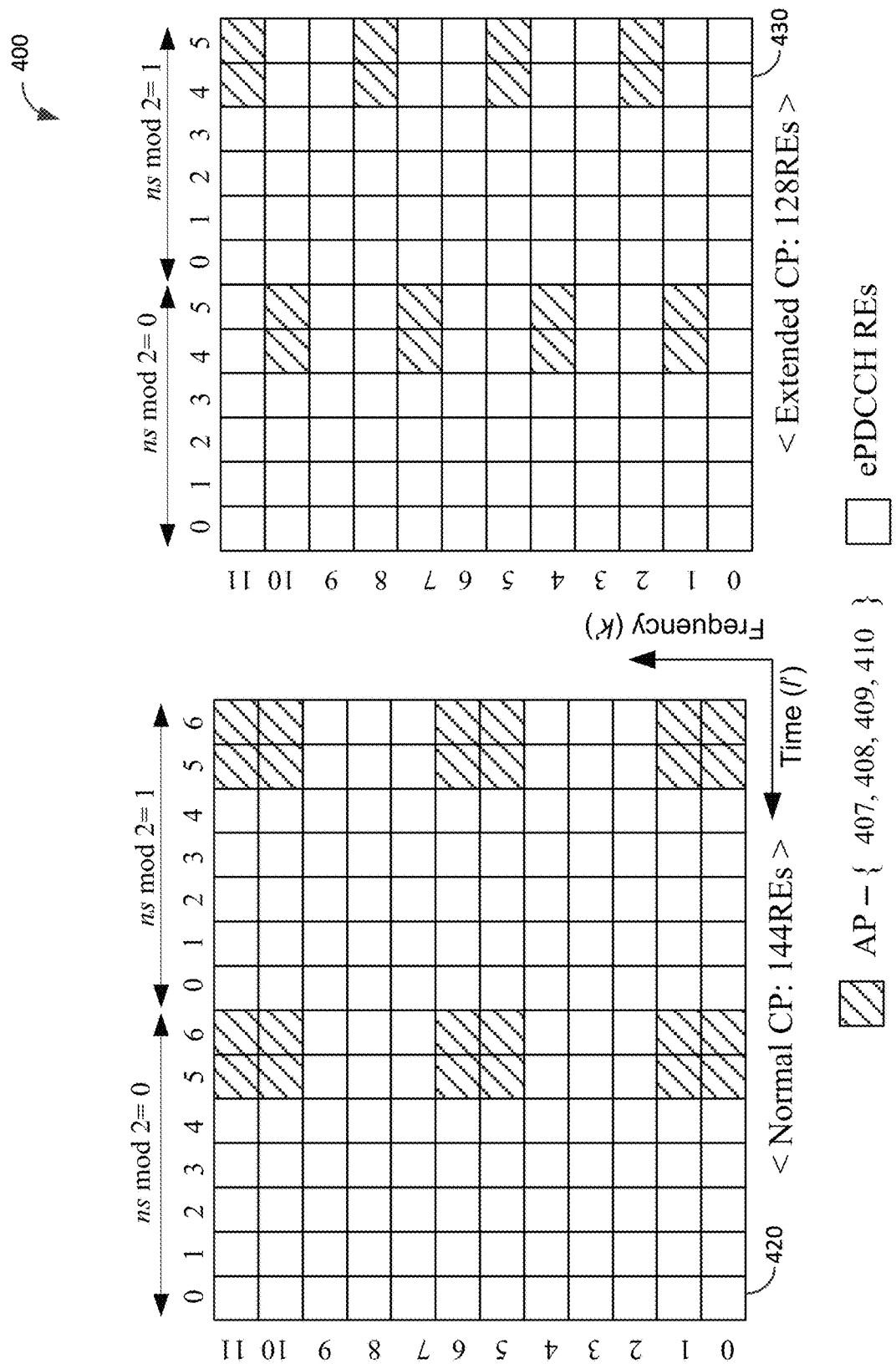
FIG. 4 is a diagram illustrating exemplary resource elements (REs) according to an example.

FIG. 4 illustrates exemplary EPDCCH RE definitions 420 and 430 for a PRB-pair based on a CP length without collision with other signals. A result in such an example may be 144 available REs (as shown in EPDCCH RE definition 420) and/or 128 available REs (as shown in EPDCCH RE definition 430) for normal CP and extended CP, respectively.

EPDCCH resources may be configured in a PDSCH region so that REs for an EPDCCH may collide with one or more other signals, such as, but not limited to, CSI-RS, CRS, PRS, PBCH, SCH, and PDCCH. WTRU behaviors when REs collide with one or more other signals may include rate-matching coded bits for an EPDCCH around for the REs colliding with CSI-RS, CRS, and/or PDCCH. WTRU behaviors when REs collide with one or more other signals may also, or instead, include using a PRB-pair for PBCH and SCH in a subframe that may not be used for EPDCCH. If other signals may be transmitted in a PRB-pair configured for EPDCCH, available REs for EPDCCH may be reduced.

A WTRU may monitor and/or attempt to decode a set of EPDCCH candidates in a subframe or TTI, where an EPDCCH candidate may be determined based on an ECCE aggregation level, a starting ECCE number, and/or a mode of operation (e.g., localized, distributed). The terms "EPDCCH candidate" and "EPDCCH decoding candidate" may be used interchangeably herein.

A set of EPDCCH candidates for a WTRU-specific search space may be determined in a WTRU-specific manner. A set of EPDCCH candidates for a common search space may be determined in a cell-specific manner.

A set of ECCE aggregation levels that may be associated with EDCCH candidates in an EPDCCH search space may be determined as a function of at least one of a number of PRB-pairs configured for an EPDCCH resource set, available REs ($n_{EPDCCH}$) in a subframe, an EPDCCH search space type (e.g., common search space, WTRU-specific search space), a subframe type (e.g., normal subframe, special subframe), a cyclic prefix (CP) length (e.g., normal CP, extended CP), and/or an EPDCCH operation mode (e.g., localized, distributed).

Tables 5 and 6 provide examples of a set of ECCE aggregation levels (L) and an associated number of EPDCCH candidates for each ECCE aggregation level in an EPDCCH search space according to a number of PRB-pairs ($N_{RB}^{X_p}$) configured for an EPDCCH resource set.

TABLE 5

Example set of EPDCCH candidates that may be monitored by a WTRU for a distributed EPDCCH according to a number of available REs ($n_{EPDCCH}$)

| | Number of EPDCCH candidates $M_p^{(L)}$ for $n_{EPDCCH} < 104$ | | | | | Number of EPDCCH candidates $M_p^{(L)}$ for $n_{EPDCCH} \geq 104$ | | | | |
|---|---|---|---|---|---|---|---|---|---|---|
| $N_{RB}^{X_p}$ | L = 2 | L = 4 | L = 8 | L = 16 | L = 32 | L = 1 | L = 2 | L = 4 | L = 8 | L = 16 |
| 2 | 4 | 2 | 1 | 0 | 0 | 4 | 2 | 1 | 0 | 0 |
| 4 | 8 | 4 | 2 | 1 | 0 | 8 | 4 | 2 | 1 | 0 |
| 8 | 6 | 4 | 3 | 2 | 1 | 6 | 4 | 3 | 2 | 1 |

TABLE 6

Example number of EPDCCH candidates that may be monitored by a WTRU for a localized EPDCCH according to a number of available REs ($n_{EPDCCH}$)

| | Number of EPDCCH candidates $M_p^{(L)}$ for $n_{EPDCCH} < 104$ | | | | Number of EPDCCH candidates $M_p^{(L)}$ for $n_{EPDCCH} \geq 104$ | | | |
|---|---|---|---|---|---|---|---|---|
| $N_{RB}^{X_p}$ | L = 2 | L = 4 | L = 8 | L = 16 | L = 1 | L = 2 | L = 4 | L = 8 |
| 2 | 4 | 2 | 1 | 0 | 4 | 2 | 1 | 0 |
| 4 | 8 | 4 | 2 | 1 | 8 | 4 | 2 | 1 |
| 8 | 6 | 6 | 2 | 2 | 6 | 6 | 2 | 2 |

A CSI-RS transmission may be used for a measurement of CSI and/or for CSI reporting. A CSI-RS transmission may be (in some examples, only) transmitted in a periodic manner, for example, according to a higher layer configuration. When a WTRU may be triggered for CSI reporting, the WTRU may (in some examples, already) have CSI configuration information for CSI reporting. Periodic CSI-RS transmission may, for example, require more reference signal overhead and/or provide less flexibility than using a WTRU-specific CSI-RS transmission.

Aperiodic CSI-RS transmission may be used to reduce reference signal overhead. An aperiodic CRS-RS transmission may be used for aperiodic CSI reporting. A presence of an aperiodic CSI-RS may be indicated dynamically for aperiodic CSI-RS reporting. Performance of downlink channels in a subframe that may contain aperiodic CSI-RS may, for example, be degraded. An aperiodic CSI-RS may interfere with other downlink channels, for example, when a WTRU may not be aware of a presence of an aperiodic CSI-RS. For example, a WTRU may fail to receive a dynamic indication of an aperiodic CSI-RS presence. Such a WTRU may fail to receive other downlink channels in a same subframe as well.

A WTRU may be configured to monitor EPDCCH. Such a WTRU may not be able to receive an indication of an aperiodic CSI-RS presence before the WTRU may start attempting to decode a configured EPDCCH search space, for example, where a dynamic indication of an aperiodic CSI-RS presence may be signaled in the EPDCCH search space. Performance of EPDCCH may thereby be degraded.

Aperiodic (e.g., triggered) CSI-RS transmission and/or reporting may improve flexibility of CSI-RS transmission in a WTRU-specific manner. CSI-RS transmission and/or associated CSI reporting may be based on triggering, for example, eNodeB triggering.

An eNodeB may trigger an aperiodic CSI reporting in a subframe (e.g., subframe n). Such a subframe's associated measurement reference signal (e.g., CSI-RS) may be transmitted in the same subframe (e.g., subframe n) and/or in one or more adjacent subframes (e.g., subframe n−2, n−1, n+1, n+2, etc.).

Triggering of aperiodic CSI reporting may be based on an indication that may be signaled, monitored, and/or decoded (e.g., by a WTRU) in a subframe or a subset of subframes. An indication of aperiodic CSI reporting triggering may be an implicit indication or an explicit indication.

The terms "aperiodic CSI reporting," "A-CSI reporting," "A-CSI," "CSI reporting triggered," "triggering based CSI reporting," "PUSCH based CSI reporting," "CSI reporting on PUSCH," "CSI reporting based on a dynamic indication," "indication based CSI reporting," and "one shot CSI reporting" may be used interchangeably herein. The terms "subframe," "transmission time interval (TTI)," and "time unit for a transmission" may also be used interchangeably herein. The terms "aperiodic measurement reference signal," "triggered measurement reference signal," "CSI-RS," "aperiodic CSI-RS," "aperiodic CSI-IM," "A-CSI-IM," "A-CSI-RS," "triggering based CSI-RS," "one shot CSI-RS," "dynamic indication based CSI-RS," "CSI-RS resource indicated in downlink control indicator (DCI)," and "CSI-RS associated with an A-CSI only" may also be used interchangeably herein. The terms "A-CSI-RS," "RE location of A-CSI-RS in a subframe," "A-CSI-RS configuration," "time and frequency location of A-CSI-RS," "A-CSI-RS pattern," "A-CSI-RS reuse pattern," and "A-CSI-RS locations" may also be used interchangeably herein.

An associated measurement reference signal for A-CSI reporting may be transmitted, signaled, received, and/or measured (e.g., by a WTRU) aperiodically. An aperiodic measurement reference signal for A-CSI reporting may be referred to as "aperiodic CSI-RS" herein.

A CSI-RS transmitted periodically may be referred to as "P-CSI-RS" and used interchangeably with a CSI-RS configured by a higher layer. A presence of a P-CSI-RS in a subframe may be known to a WTRU before such a WTRU may start receiving a signal from the subframe. A CSI-RS transmitted aperiodically may be referred to as "A-CSI-RS." A presence of an A-CSI-RS in a subframe may be determined based on a dynamic indication. A dynamic indication for a presence of an A-CSI-RS may be associated with one or more subframes. A dynamic indication for a presence of A-CSI-RS may be used for activation and/or deactivation of an A-CSI-RS. For example, such an indication may activate an A-CSI-RS, which may be transmitted periodically until deactivated.

A full CSI configuration (e.g., full CSI configuration information) may be configured via a higher layer (e.g., RRC signaling), for example for P-CSI-RS. A full CSI configuration may include, for example, one or more of a CSI-RS pattern, a number of CSI processes, a duty cycle of CSI-RS transmission, a number of CSI-RS ports, a time/frequency locations of CSI-RS, and a transmission power of a CSI-RS.

A partial CSI configuration (e.g., partial CSI configuration information) may be configured via a higher layer (e.g., RRC signaling), for example for A-CSI-RS. A partial CSI-RS configuration may include a subset of a full CSI configuration. A partial CSI-RS configuration may include, for example, one or more CSI-RS patterns and/or one or more indications thereof. A subset of a full CSI configuration or a partial CSI configuration may be indicated dynamically, for example, from a DCI (e.g., a DCI that may trigger A-CSI reporting). In an example, a DCI may indicate that one or more portions of a CSI configuration (e.g., full or partial) may be applicable to a given CSI-RS transmission. For example, at least one CSI-RS pattern that may be used in a subframe and/or a presence of a configured CSI-RS pattern may be dynamically indicated (e.g., from a DCI).

One or more A-CSI-RSs may be indicated to a WTRU in a subframe. An A-CSI-RS may be categorized into a type, for example from among two or more types. A first type of an A-CSI-RS may be used for CSI measurement and/or RE muting of one or more other physical channels. Such a first type of an A-CSI-RS may be a non-zero-power A-CSI-RS for a WTRU. Such a first type of an A-CSI-RS for a first WTRU may be considered, determined, and/or used as a second type of an A-CSI-RS for a second WTRU.

A second type of an A-CSI-RS may be used for RE muting of one or more other downlink physical channels, in some examples, only for RE muting of one or more downlink physical channels. Such RE muting may be puncturing and/or rate-matching. A second type of an A-CSI-RS may be a zero-power A-CSI-RS for a WTRU. RE muting may correspond to a WTRU refraining from and/or attempting to refrain from transmitting any signal energy on the A-CSI-RS resources. A second type of an A-CSI-RS for a first WTRU may be considered, determined, and/or used as a first type of an A-CSI-RS for a second WTRU.

A first type of an A-CSI-RS may be referred to as a "Type-1 A-CSI-RS" herein. A second example type of an A-CSI-RS may be referred to as "Type-2 A-CSI-RS" herein.

A WTRU may receive an indication of one or more Type-1 A-CSI-RSs. Such a WTRU may measure CSI from the indicated one or more Type-1 A-CSI-RSs and consider, determine, and/or assume that each RE(s) occupied by one or more Type-1 A-CSI-RS(s) may be a muted RE for reception of one or more downlink channels (e.g., PDSCH, EPDCCH) that may be scheduled for the WTRU.

A WTRU may receive an indication of one or more Type-2 A-CSI-RSs. Such a WTRU may consider, determine, and/or assume that each RE(s) occupied by one or more Type-2 A-CSI-RS may be a muted RE for reception of downlink channels that may be scheduled for the WTRU. For example, a WTRU may be scheduled for a PDSCH in a subframe and such a WTRU may receive an indication that one or more Type-2 A-CSI-RS may be in the same subframe. Such a WTRU may consider each RE(s) occupied by the indicated Type-2 A-CSI-RS as a muted RE for scheduled PDSCH reception.

A WTRU may be configured with one or more A-CSI-RSs and/or one or more P-CSI-RS s for CSI reporting and/or RE muting of one or more downlink physical channels. A CSI-RS configuration for an A-CSI-RS may differ from a CSI-RS configuration for an P-CSI-RS. A CSI-RS configuration may include at least one of, but not limited to, a number of antenna ports, a scrambling sequence, a duty cycle, a starting offset, a transmission power, and a reuse pattern.

A WTRU may be indicated, configured, and/or determined to receive, measure, and/or handle one or more A-CSI-RSs and/or one or more P-CSI-RSs in a same subframe. For example, a WTRU may be configured with a P-CSI-RS for CSI reporting and may be indicated to receive and/or measure an A-CSI-RS in a subframe in which the configured P-CSI-RS may be transmitted.

A WTRU may measure an A-CSI based on a P-CSI-RS. Such a WTRU may be indicated to report A-CSI in a subframe in which no A-CSI-RS may be indicated. A P-CSI-RS for such an A-CSI measurement may be located in the same subframe or in a previous subframe. A WTRU may be indicated to report A-CSI in a subframe and the WTRU may assume that an A-CSI-RS may be transmitted in the subframe.

A WTRU may be indicated independently for each of an A-CSI reporting request and an A-CSI-RS indication, where such an A-CSI-RS indication may include at least one indication of a presence or absence of an A-CSI-RS, configuration information of an A-CSI-RS, and an A-CSI-RS configuration index.

A bit field may be used to indicate an A-CSI reporting request and/or an A-CSI-RS presence indication. For example, one or more states from a bit field may be indicated to trigger A-CSI reporting and/or to indicate presence of one or more A-CSI-RS(s). Two bits may be used to indicate an A-CSI reporting trigger and an A-CSI-RS presence indication (e.g., 00 may indicate an A-CSI reporting trigger with an A-CSI-RS absence, 01 may indicate an A-CSI reporting trigger with an A-CSI-RS presence, 10 may indicate no A-CSI trigger and an A-CSI-RS presence, 11 may be reserved). An indication of an A-CSI-RS presence without an A-CSI trigger may be used to indicate that RE muting may be performed for one or more other physical channels.

A bit field for a Type-1 A-CSI-RS indication may be located and/or used in a DCI associated with uplink transmission (e.g., DCI format 0/4). A bit field for a Type-2 A-CSI-RS indication may be located and/or used in a DCI associated with downlink transmission (e.g., DCI formats 1/2/2A/2B/2C).

A bit field for a Type-1 A-CSI-RS indication may be located in a DCI associated with an uplink grant. A bit field for both a Type-1 and a Type-2 A-CSI-RS indication may be located and/or used in a DCI that may be dedicated to A-CSI-RS indication. A bit field for both a Type-1 and a Type-2 A-CSI-RS indication may be used as an indication of a superset of A-CSI-RS configurations in a subframe. A bit field in a DCI associated with an uplink grant that may indicate a Type-1 A-CSI-RS may be used as a subset of A-CSI-RS configurations.

A bit field for one or more A-CSI-RS configurations, which may be used (e.g., commonly) for one or more WTRUs in a subframe, may be located and/or used in a common DCI, where such a common DCI may be monitored by one or more WTRUs. A WTRU may receive one or more Type-1 A-CSI-RS indications in a WTRU-specific DCI (e.g., DCI format 0/4) in a same subframe. Indicated Type-1 A-CSI-RS configuration(s) may be a subset of one or more A-CSI-RS configurations that may be indicated from a common DCI.

A WTRU that may receive one or more Type-1 A-CSI-RS configurations may consider other A-CSI-RS configurations in a common DCI that may not be in Type-1 A-CSI-RS configurations, such as Type-2 A-CSI-RS configurations. A WTRU that may not receive one or more Type-1 A-CSI-RS configurations may consider one or more A-CSI-RS configurations (e.g., all A-CSI-RS configurations) in a common DCI to be Type-2 A-CSI-RS configurations.

A WTRU may receive an indication of a CSI-RS that may be used for A-CSI reporting between an A-CSI-RS and a P-CSI-RS when the WTRU may be instructed (e.g., indicated) to report A-CSI in a subframe. Such an A-CSI-RS may be located in a same subframe that may include such a received indication of a CSI-RS. Such a P-CSI-RS may be located in the same subframe and/or one or more adjacent subframes.

One or more A-CSI-RS configurations may be indicated in a common DCI that may be monitored in a common search space. One or more P-CSI-RS configurations may be configured via higher layer signaling, such as RRC signaling.

A DCI that may be used to request A-CSI reporting may include a bit field that may indicate one or more CSI-RS configurations that may be used for a measurement of A-CSI reporting between an A-CSI-RS and a P-CSI-RS.

One or more radio network temporary identifiers (RNTIs), each of which may be scrambled using one or more cyclic redundancy checks (CRCs) for a DCI, may be used for an A-CSI reporting request. Such an A-CSI reporting request may be used to indicate a CSI-RS configuration that may be used for measurement of A-CSI reporting between an A-CSI-RS and a P-CSI-RS. A WTRU may use a P-CSI-RS for A-CSI reporting where a cell-RNTI (C-RNTI) may be used. Such a WTRU may also, or instead, use an A-CSI-RS for A-CSI reporting where a C-RNTI+1 may be used.

A WTRU may receive a DL signal in a subframe that may contain one or more A-CSI-RSs and/or one or more P-CSI-RSs. One or more of such A-CSI-RSs and/or P-CSI-RSs may be used for RE muting of a downlink signal. A WTRU may receive a PDSCH in a subframe that may contain one or more A-CSI-RSs and/or one or more P-CSI-RSs. Such a WTRU may assume, consider, and/or determine that REs occupied by A-CSI-RSs and/or P-CSI-RSs are muted.

A WTRU may assume and/or determine that REs that may be occupied by, used by, and/or allocated to a CSI-RS (e.g., A-CSI-RS, P-CSI-RS) in a PDSCH resource may be muted REs of an associated PDSCH transmission. Such a WTRU may determine that muted REs of the associated PDSCH transmission may be punctured REs and/or rate-matched REs, e.g., based on one or more criteria that may be determined by such a WTRU.

Such criteria may include a type of an A-CSI-RS. For example, puncturing may be used for a Type-1 A-CSI-RS and rate-matching may be used for a Type-2 A-CSI-RS, or vice versa.

Such criteria may also, or instead, include a periodic or aperiodic character of an RS. For example, rate-matching may be used for a P-CSI-RS and puncturing may be used for an A-CSI-RS, or vice versa.

Such criteria may also, or instead, include a modulation order that may be used for a scheduled PDSCH. For example, puncturing may be used for a lower modulation order (e.g., QPSK) while rate-matching may be used for a higher modulation order (e.g., 16QAM, 64QAM), or vice versa.

Such criteria may also, or instead, include a coding rate or an effective coding rate that may be used for a scheduled PDSCH. For example, puncturing may be used for a coding rate or effective coding rate that may be below a threshold, while rate-matching may be used for a coding rate or effective coding rate that may be equal to or higher than a threshold, or vice-versa. In an additional example, puncturing may be used for a transport block size (TBS) that may be smaller than a threshold, while rate-matching may be used for a TBS that may be equal to or larger than a threshold, or vice-versa. Such thresholds may be predefined and/or configured.

Such criteria may also, or instead, include a number of codewords and/or a rank. For example, puncturing may be used if a number of codewords is one (e.g., rank=1) and rate-matching may be used if a number of codewords is higher than one (e.g., rank>1), or vice-versa.

Such criteria may also, or instead, include an indication that may be included in a DCI. For example, a bit field may indicate whether a muted RE of a scheduled PDSCH, where the RE may be muted due to a CSI-RS, may be rate-matched around and/or punctured for demodulation.

RE muting may be used for one or more scheduled PDSCH REs that may have collided with a CSI-RS. A use of RE muting may be determined based on one or more criteria that may be determined by a WTRU. Such criteria may include a type of A-CSI-RS. For example, a WTRU may assume that RE muting may be used for a Type-1 A-CSI-RS and that no RE muting may be used for a Type-2 A-CSI-RS, or vice versa.

Such criteria may also, or instead, include a periodic or aperiodic character of an RS. For example, a WTRU may determine that RE muting may be used for a P-CSI-RS and that no RE muting may be used for an A-CSI-RS, or vice versa.

Such criteria may also, or instead, include a modulation order that may be used for a scheduled PDSCH.

Such criteria may also, or instead, include a coding rate or effective coding rate that may be used for a scheduled PDSCH.

Such criteria may also, or instead, include a number of codewords and/or a rank.

Such criteria may also, or instead, include an indication that may be provided in a DCI.

A WTRU may be configured to monitor an EPDCCH for one or more DCIs that may be associated with at least one of PDSCH scheduling, PUSCH scheduling, and/or common control information. The terms "enhanced PDCCH," "EPDCCH," "MTC PDCCH," "MPDCCH," "narrowband PDCCH," and "NB-PDCCH" may be used interchangeably herein. "EPDCCH" may be referred to as a downlink control channel monitored, decoded, received, and/or transmitted in a PDCCH region.

Where a WTRU may be configured to monitor an EPDCCH, one or more REs that may be occupied by CSI-RS (e.g., A-CSI-RS, P-CSI-RS) in EPDCCH resources may be muted. EPDCCH REs that may collide with CSI-RS may be muted.

A set of ECCE aggregation levels for EPDCCH candidates in an EPDCCH search space may be determined based on available REs ($n_{EPDCCH}$) in a subframe and/or a PRB-pair configured for an EPDCCH resource set. Such available REs may exclude REs that may be used by a CSI-RS in the subframe. Where a number of available REs may be greater than, or greater than or equal to, a threshold (e.g., a predetermined threshold, a preconfigured threshold), a first set of ECCE aggregation levels may be used and/or determined for an EPDCCH search space. A second set of ECCE aggregation levels may be used and/or determined for a EPDCCH search space where a number of available REs may be less than, or less than or equal to, a threshold (e.g., a predetermined threshold, a preconfigured threshold).

An RE that may be used for a CSI-RS may be determined to be an available RE based on one or more of CSI-RS properties. One or more REs that may be used for and/or occupied by a P-CSI-RS may be determined to be unavailable (e.g., muted). One or more REs that may be used for an A-CSI-RS may be determined to be available REs.

One or more REs that may be used for an A-CSI-RS may be determined to be available REs. A WTRU may consider such REs as muted REs in decoding one or more EPDCCH candidates.

One or more REs that may be used for a P-CSI-RS may be determined to be unavailable REs. A WTRU may consider such REs as muted REs in decoding one or more EPDCCH candidates.

A set of one or more ECCE aggregation levels may be determined as a function of a presence of a P-CSI-RS. Such a set of EPDCCH aggregation levels may be determined independent of a presence of an A-CSI-RS.

A number of EREGs per ECCE may be determined based on a presence of an A-CSI-RS in a subframe. $N_1$ (e.g., 4) EREGs per ECCE may be used when, for example, an A-CSI-RS may not be presented in a subframe. N2 (e.g., 8) ERGEs per ECCE may be used when, for example, an A-CSI-RS may be presented in a subframe.

A number of EREGs per ECCE may be determined based on a presence of an A-CSI-RS in a subframe and/or a number of REs that may be used for an A-CSI-RS in a PRB. Where a number of REs that may be used for an A-CSI-RS in a PRB may be less than, or less than or equal to, a threshold (e.g., a predetermined threshold, a preconfigured threshold) (e.g., $N_{THRESHOLD}=16$), $N_1$ EREGs per ECCE may be used. Where a number of REs that may be used for an A-CSI-RS in a PRB may be greater than, or greater than or equal to, a threshold (e.g., a predetermined threshold, a preconfigured threshold), N2 EREGs per ECCE may be used.

A number of REs that may be used for an A-CSI-RS may include a count of REs used for one or more Type-1 A-CSI-RSs or Type-2 A-CSI-RSs (e.g., used only for one or more Type-1 A-CSI-RSs or Type-2 A-CSI-RSs). A threshold (e.g., a predetermined threshold, a preconfigured threshold) may be based on a number of PRB-pairs that may be configured for an EPDCCH resource set. $N_1$ values may differ from N2 values based on at least one of a subframe type, a CP length, and/or a duplex mode (e.g., TDD or FDD).

EPDCCH RE muting may be used for REs that may be occupied by a CSI-RS. Puncturing and/or rate-matching for such muted REs may be determined based on a type of an A-CSI-RS. For example, EPDCCH RE puncturing may be used for a Type-1 A-CSI-RS, while EPDCCH RE rate-matching may be used for a Type-2 A-CSI-RS, or vice versa.

Puncturing and/or rate-matching for such muted REs may also, or instead, be determined based on a periodic or aperiodic character of an RS. For example, EPDCCH RE rate-matching may be used for a P-CSI-RS, while EPDCCH RE puncturing may be used for an A-CSI-RS, or vice versa.

Puncturing and/or rate-matching for such muted REs may also, or instead, be determined based on an EPDCCH search space type. For example, EPDCCH RE puncturing may be used for an A-CSI-RS in EPDCCH common search space, while EPDCCH RE rate-matching may be used for an A-CSI-RS in EPDCCH WTRU-specific search space, or vice versa.

Puncturing and/or rate-matching for such muted REs may also, or instead, be determined based on an ECCE aggregation level of an EPDCCH candidate.

A use of EPDCCH RE muting for EPDCCH REs that may be occupied by a CSI-RS may be determined based on a type of an A-CSI-RS. EPDCCH RE muting for EPDCCH REs that may be occupied by a CSI-RS may be used for a type-1 A-CSI-RS, while no EPDCCH RE muting may be used for a Type-2 A-CSI-RS, or vice versa. Alternatively, or in addition, EPDCCH RE muting for EPDCCH REs that may be occupied by a CSI-RS may be used based on a periodic or aperiodic character of an RS. For example, EPDCCH RE muting may be used for a P-CSI-RS, while no EPDCCH RE muting may be used for an A-CSI-RS, or vice versa. Alternatively, or in addition, EPDCCH RE muting for EPDCCH REs that may be occupied by a CSI-RS may be used based on an EPDCCH search space type. For example, EPDCCH RE muting may be used for a CSI-RS that may be in an EPDCCH common search space, while no EPDCCH RE muting may be used for a CSI-RS that may be in an EPDCCH WTRU-specific search space, or vice versa. Alternatively, or in addition, EPDCCH RE muting for EPDCCH REs that may be occupied by a CSI-RS may be used based on an ECCE aggregation level of an EPDCCH candidate.

EPDCCH REs that may be used for an A-CSI-RS may be considered unavailable REs (e.g., muted REs). An A-CSI-RS and/or A-CSI-RS patterns for EPDCCH RE muting may be indicated in a DCI that may be transmitted and/or monitored in a PDCCH common search space. A WTRU may determine an EPDCCH aggregation level set for an EPDCCH WTRU-specific search space in a subframe based on a presence or absence of, and/or patterns of, an A-CSI-RS that may be indicated in a DCI that may be received and/or monitored in a PDCCH common search space in a same subframe.

A DCI may be transmitted and/or received in a subframe (e.g., only in the subframe) in which one or more A-CSI-RSs may be presented. Alternatively, or in addition, a DCI may be transmitted and/or received in all subframes irrespective of a presence of an A-CSI-RS. A bit field may be used to indicate an absence or presence of an A-CSI-RS and/or one or more A-CSI-RS patterns. Where such a bit field may indicate an absence of an A-CSI-RS in a subframe, a WTRU may determine that there is no A-CSI-RS in the subframe. Alternatively, or in addition, an EPDCCH aggregation level set determination may be based on available REs, where available REs may be determined based on an absence or presence of an A-CSI-RS. Where a WTRU fails to receive a DCI that may indicate an absence or presence of an A-CSI-RS in a subframe, the WTRU may not monitor EPDCCH in the subframe.

A collision between an EPDCCH and an A-CSI-RS may be avoided using one or more A-CSI-RS presences and/or transmissions. Such A-CSI-RS presences and/or transmissions may be limited to a subset of time and/or frequency resources. Subframes and/or radio frames may have a DCI that may indicate a presence of an A-CSI-RS. A WTRU may monitor the DCI of such subframes and/or radio frames. Such subframes and/or radio frames may be limited to a subset of subframes and/or radio frames in a system. Such a subset of subframes and/or radio frames may be configured via higher layer signaling.

Alternatively, or in addition, subframes and/or radio frames that may have a DCI that may be monitored by a WTRU may indicate a presence of an A-CSI-RS. Such subframes and/or radio frames that may be monitored by such a WTRU may be determined as a function of one or more of a subframe number, a radio frame number (e.g., a system frame number (SFN)), a physical cell-ID, and/or a WTRU-ID.

Alternatively, or in addition, a WTRU may determine that an A-CSI-RS may not be transmitted and/or located in one or more PRBs configured and/or used for an EPDCCH, for example, regardless of whether one or more A-CSI-RSs may or may not be presented in a subframe.

A WTRU-specific search space may be switched between a PDCCH and an EPDCCH based on a presence of an A-CSI-RS in a subframe. For example, a WTRU may be configured with an EPDCCH for a WTRU-specific search space and, where the WTRU may receive an indication of a presence of an A-CSI-RS in a subframe, the WTRU may monitor a PDCCH for the WTRU-specific search space in the subframe. A PDCCH WTRU-specific search space may be used as a fallback WTRU-specific search space. Such a fallback WTRU-specific search space may be used where one or more A-CSI-RSs may collide with an EPDCCH WTRU-specific search space. Alternatively, or in addition, a presence of an A-CSI-RS in a subframe may be indicated by a DCI. Such a DCI may be transmitted and/or monitored in a PDCCH common search space. Alternatively, or in addition, a presence of an A-CSI-RS in a subframe may be indicated in a previous subframe. Alternatively, or in addition, a WTRU may not monitor one or more EPDCCH candidates in a subframe where such one or more EPDCCH candidates may collide with one or more A-CSI-RSs that may be present in the subframe.

A set of antenna ports for a CSI-RS configuration may be indicated in a transmission of a subset of PRBs. For example, a set of antenna ports (e.g., a present set of antenna ports) for a CSI-RS configuration in a PRB may be determined based on a PRB index. Alternatively, or in addition, a set of antenna ports (e.g., a present set of antenna ports) for a first CSI-RS configuration may be presented in one or more PRBs that may have or be associated with even-numbered PRB indexes, while a set of antenna ports (e.g., a present set of antenna ports) for a second CSI-RS configuration may be presented in one or more PRBs that may have or be associated with odd-numbered PRB indexes, or vice versa.

A WTRU may receive an indication of a subset of one or more PRBs that may contain an associated CSI-RS. For example, a first set of PRBs (e.g., a set that may have even-numbered PRB indexes) may be indicated for a first WTRU, while a second set of PRBs (e.g., a set that may have odd-numbered PRB indexes) may be indicated for a second, different WTRU. Such an indication may be signaled as a part of one or more CSI-RS configuration parameters. Alternatively, or in addition, such an indication may be signaled in an associated DCI for A-CSI-RS triggering.

CSI-RS PRB-level nulling may be used, where a set of antenna ports for a CSI-RS configuration may be transmitted in a subset of one or more PRBs. Use of such nulling may be determined based on a number of antenna ports. For example, where a number of antenna ports for a CSI-RS may be greater than, or greater than or equal to, a threshold (e.g., a predetermined threshold, a preconfigured threshold) (e.g., 16), CSI-RS PRB-level nulling may be used. A set of antenna ports for a CSI-RS configuration may be used interchangeably with a number of antenna ports.

PRB indices for which CSI-RS PRB-level nulling may be used may be determined based on a subframe and/or a radio frame number. Alternatively, or in addition, PRB indices for which CSI-RS PRB-level nulling may be used may be determined based on a CSI-RS PRB-level nulling may be determined based on a WTRU-ID (e.g., C-RNTI). Alternatively, or in addition, PRB indices for which CSI-RS PRB-level nulling may be used may be determined based on a P-CSI-RS and/or an A-CSI-RS.

A set of one or more PRBs associated with a CSI-RS transmission may be determined based on one or more of a number of antenna ports configured for the CSI-RS, one or more types of CSI-RSs (e.g., P-CSI-RS, A-CSI-RS), one or more system parameters (e.g., subframe number, radio frame number, physical cell-ID), and/or one or more WTRU-specific parameters (e.g., WTRU-ID). Such a determined set of PRBs may include all PRBs in a subframe or a subset of PRBs in a subframe.

One or more downlink control signals may be used for an A-CSI-RS. For example, two control signal indications (e.g., DCIs) may be used for an A-CSI-RS. A first DCI may be used to indicate one or more active A-CSI-RS patterns (e.g., an active A-CSI-RS set). A second DCI may be used to indicate active A-CSI-RS patterns that may be used for CSI measurement. An active A-CSI-RS set may include one or more A-CSI-RS configurations that may be active and/or presented in an associated time window and/or location (e.g., a subframe). An active A-CSI-RS set may be interchangeably used as a common A-CSI-RS set.

An active A-CSI-RS set may be a subset of A-CSI-RS patterns that may be configured by higher layer signaling. Alternatively, or in addition, a WTRU may determine that one or more A-CSI-RS patterns in an active A-CSI-RS set may be presented in an associated time location (e.g., a subframe). Alternatively, or in addition, a WTRU may monitor, receive, and/or attempt to decode a first DCI that may carry one or more active A-CSI-RS patterns. This may be performed regardless of whether such a WTRU may be configured for A-CSI-RS based A-CSI reporting. Alternatively, or in addition, a WTRU may use active A-CSI-RS set information where such a WTRU may receive, attempt to decode, and/or be scheduled for a downlink transmission (e.g., PDSCH, EPDCCH) in an associated time window and/or location (e.g., a PDSCH region in a subframe). Alternatively, or in addition, RE muting may be used for a downlink transmission (e.g., PDSCH, EPDCCH) on REs used and/or occupied by an active A-CSI-RS set in a subframe. Alternatively, or in addition, an associated time window for one or more active A-CSI-RS patterns may be determined based on activation and/or deactivation of the active A-CSI-RS patterns. For example, active A-CSI-RS patterns may be activated in a subframe n and deactivated in another subframe n+k.

One or more A-CSI-RS patterns in an active A-CSI-RS set may be indicated in a DCI (e.g., such as a second DCI as described herein that may be used to indicate active A-CSI-RS patterns to use for CSI measurement) and referred to as a dedicated A-CSI-RS set. The terms "dedicated A-CSI-RS set" and "measurement A-CSI-RS set" may be used interchangeably herein.

A dedicated A-CSI-RS set may be one or more WTRU-specific A-CSI-RS patterns that may be used for CSI measurement. Alternatively, or in addition, a dedicated A-CSI-RS set may be used for CSI reporting. Alternatively, or in addition, partial configuration information (e.g., transmission power, quasi-collocation, a number of antenna ports) of a dedicated A-CSI-RS set may be configured by higher layer signaling, while some or all remaining configuration information (e.g., a CSI-RS reuse pattern) may be indicated in another DCI (e.g., a second DCI).

A DCI for an active A-CSI-RS set information (e.g., a first DCI) may be transmitted and/or monitored in a common search space (CSS), such as a PDCCH CSS and/or an EPDCCH CSS. Such a DCI may be monitored by a WTRU in PDCCH CSS and/or an EPDCCH CSS, where the PDCCH CSS and/or an EPDCCH CSS for the DCI may be different from a PDCCH CSS and/or an EPDCCH CSS for other DCIs. Such other DCIs may be carrying multi-cast and/or broadcast signals. For example, control channel elements, such as a CCE and/or ECCE, which may be referred to herein as (E)CCE, #0~#15 may be used for a PDCCH CSS and/or an EPDCCH CSS for such other DCIs that may be carrying multi-cast and/or broadcast signals (e.g., DCIs with P-RNTI, SI-RNTI). Control channel elements (E)CCE #16~#32 may be used for a PDCCH CSS and/or an EPDCCH CSS for such a DCI. The DCI may include the active A-CSI-RS set.

Such a DCI (e.g., the first DCI) may be scrambled with a common RNTI. Alternatively, or in addition, such a DCI may include a bit field that may indicate an active A-CSI-RS set. Such a bit field may be a bitmap that may be associated with one or more $N_{A\text{-}CSI\text{-}RS}$ A-CSI-RS configurations. For example, where one or more $N_{A\text{-}CSI\text{-}RS}$ A-CSI-RS configurations may be used and/or configured via higher layer signaling, $N_{A\text{-}CSI\text{-}RS}$ bits may be used for the bit field and/or may indicate active and/or non-active A-CSI-RS configurations. Alternatively, or in addition, one or more groups of one or more active A-CSI-RS sets may be defined, predefined, and/or configured. Such one or more groups may be indicated in such a DCI (e.g., the first DCI).

A different DCI (e.g., a second DCI, as opposed to a first DCI described above) may be associated with dedicated A-CSI-RS set information that may be transmitted and/or monitored in a WTRU-specific search space. Such a different DCI (e.g., the second DCI) may be used for an uplink grant (e.g., DCI format 0/4) where a bit field may be used to indicate a dedicated A-CSI-RS set that may be used in an uplink grant. Alternatively, or in addition, a flag bit may be included and/or used in such a DCI (e.g., the second DCI) to indicate whether a bit field associated with dedicated A-CSI-RS set information may be included in the DCI. Where a flag bit may be set to TRUE, a WTRU may use one or more A-CSI-RSs indicated by the dedicated A-CSI-RS set information for A-CSI reporting. Where a flag bit may be set to FALSE, a WTRU may use a P-CSI-RS for A-CSI reporting, where such a P-CSI-RS may be located in a same subframe or in an adjacent subframe.

One or more A-CSI-RS patterns in an active A-CSI-RS set that may not be indicated in a dedicated A-CSI-RS set may be considered to be Type-2 A-CSI-RSs, while A-CSI-RS patterns that may be indicated in the active A-CSI-RS set may be considered to be Type-1 A-CSI-RSs.

An active A-CSI-RS set may be configured via a higher layer signaling (e.g., RRC, broadcasting). A dedicated A-CSI-RS set may be indicated in a DCI. One or more A-CSI-RS patterns may be configured as an active A-CSI-RS set via higher layer signaling, while one or more A-CSI-RS patterns within the active A-CSI-RS set may be indicated in a DCI as a dedicated A-CSI-RS set.

An active A-CSI-RS set may be configured by a higher layer signaling and may be used for RE muting of a downlink transmission (e.g., PDSCH, EPDCCH, PBCH, PMCH) in a subframe where a WTRU receives one or more of an A-CSI reporting request indication, a dedicated A-CSI-RS set indication, and/or an indication in a DCI. Such an indication in a DCI may be used for RE muting of a downlink transmission for REs that may be used for an active A-CSI-RS. Such an indication may be transmitted in a DCI that may be associated with PDSCH scheduling.

RE muting of a downlink transmission for one or more REs that may be used for one or more active A-CSI-RS sets may be used at one or more times (e.g., one or more predetermined times, one or more preconfigured times) and/or at one or more frequency locations (e.g., one or more predetermined frequency locations, one or more preconfigured frequency locations). Such times and/or frequency locations may be a subset of subframes that may be configured by higher layer signaling. Alternatively, or in addition, such times and/or frequency locations may be determined as a function of at least one of a subframe number, a physical cell-ID, a radio frame number (e.g., SFN), and/or a WTRU-ID (e.g., C-RNTI).

A DCI (e.g., a first DCI that may or may not be a same first DCI as described elsewhere herein) may carry active A-CSI-RS set information. Another DCI (e.g., a second DCI that may or may not be a same second DCI as described elsewhere herein) may carry dedicated A-CSI-RS set information. A WTRU may receive, attempt to decode, and/or monitor such a DCI carrying active A-CSI-RS set information (e.g., the first DCI) and such a DCI carrying dedicated A-CSI-RS set information (e.g., the second DCI) to obtain one or more Type-1 A-CSI-RS configurations and/or one or more Type-2 A-CSI-RS configurations. For example, a dedicated A-CSI-RS set may be considered a Type-1 A-CSI-RS configuration, while one or more remaining other A-CSI-RSs in the active A-CSI-RS set (that may be not indicated in the dedicated A-CSI-RS set) may be considered Type-2 A-CSI-RSs.

One or more fallback A-CSI-RS set configurations may be determined and/or used. One or more such fallback A-CSI-RS sets may be one or more sets of A-CSI-RS configurations that may be used for RE muting of a downlink transmission. One or more such fallback A-CSI-RS sets may be the same as one or more sets of A-CSI-RS patterns that may be configured via higher layer signaling. A WTRU may use such one or more fallback A-CSI-RS sets for RE muting of a downlink transmission where such a WTRU may fail to receive a DCI (e.g., the first DCI) (e.g., that may include active A-CSI-RS set information). For example, such a WTRU may have received another DCI (e.g., the second DCI) (e.g., that may include dedicated A-CSI-RS set information) in a subframe and may use one or more fallback A-CSI-RS sets for RE muting of a downlink transmission.

A WTRU may determine to not receive a downlink signal in a subframe where such a WTRU fails to receive a DCI (e.g., the first DCI) (e.g., that may include active A-CSI-RS set information). For example, such a WTRU may have received another DCI (e.g., the second DCI) that, for example, may include a dedicated A-CSI-RS set. Such a WTRU may also receive yet another DCI for PDSCH scheduling in a same subframe, while having missed the DCI (e.g., the first DCI) that may have included active A-CSI-RS set information. Such a WTRU may determine to not decode PDSCH and/or may measure A-CSI from the dedicated A-CSI-RS set (e.g., as received in the second DCI). Such a WTRU may not buffer PDSCH for a hybrid automatic repeat request (HARQ) operation (e.g., because the soft buffer may be corrupted). Alternatively, or in addition, such a WTRU may transmit a discontinuous transmission (DTX) for a corresponding PDSCH that, for example, may not be decoded based on the WTRU missing the DCI (e.g., the first DCI) that may have included active A-CSI-RS set information.

A WTRU may receive an indication that may instruct or otherwise cause the WTRU to report A-CSI in a subframe n. An A-CSI-RS for the A-CSI measurement may be reported in a subframe m. Such a WTRU may report requested A-CSI in a subframe n+k via an uplink channel.

An A-CSI reporting time (e.g., n+k) may be determined based on one or more associated CSI-RS properties. A presence of an A-CSI-RS for A-CSI reporting may not be known until a WTRU may receive an indication of an A-CSI-RS presence. This may result in increased processing time to perform channel measurement from an A-CSI-RS. k=4 may be used where A-CSI reporting may be associated with a P-CSI-RS. k>4 may be used where A-CSI reporting may be associated with an A-CSI-RS.

A-CSI reporting timing (e.g., n+k) may be determined based on one or more associated CSI-RS properties. Such reporting timing (e.g., n+k) may be determined as a function of one or more associated CSI-RS types for a triggered A-CSI. Where an associated CSI-RS type may be A-CSI-RS, reporting timing may be determined based on a time location of an A-CSI-RS m. Where m may be the same as n, reporting timing n+k may be the same for both P-CSI-RS and A-CSI-RS. Where a time location of A-CSI-RS may be m=n+t, reporting timing may be determined as n+t+k.

Figure 5:
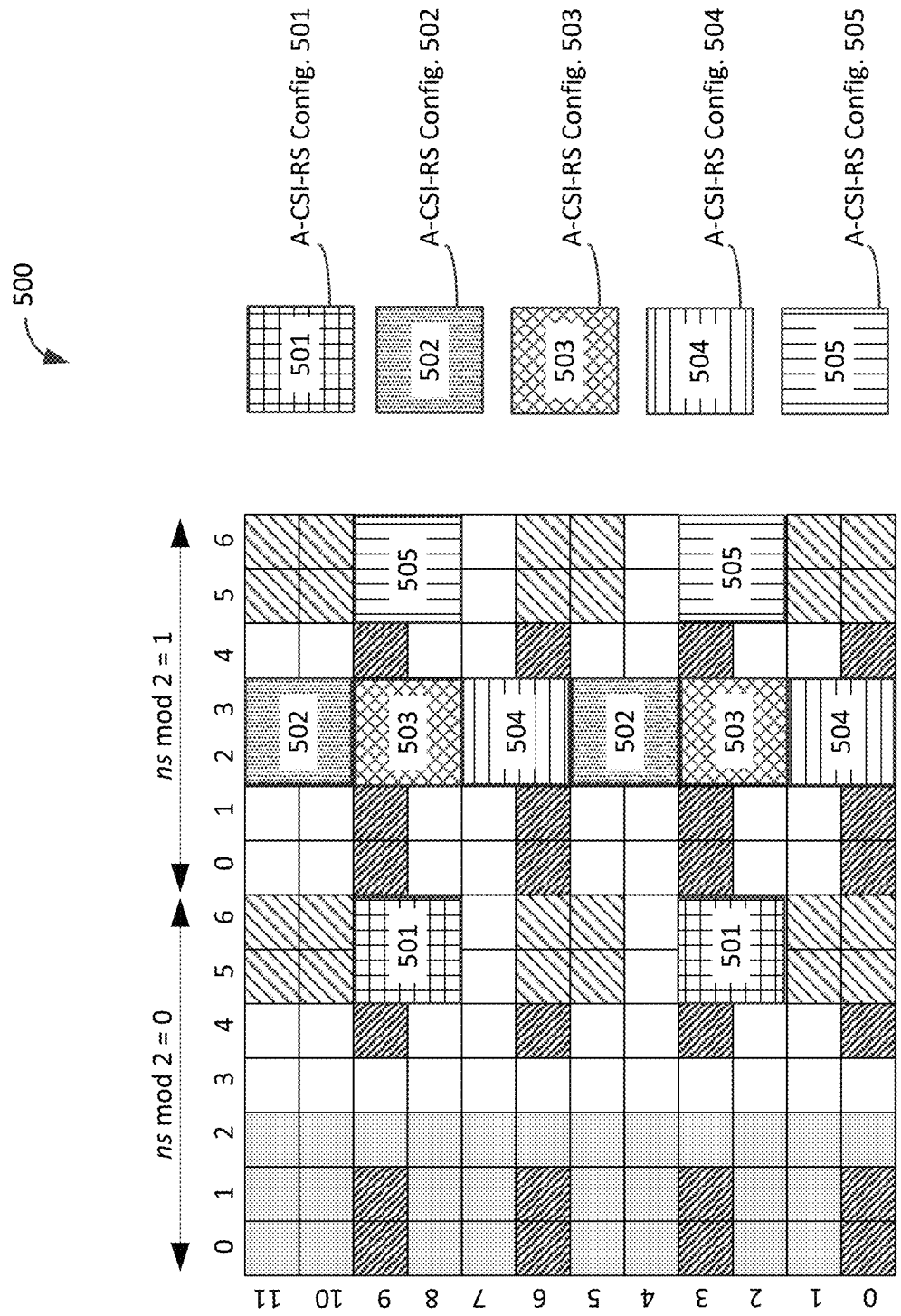
FIG. 5 is a diagram illustrating exemplary reference signal (RS) configurations according to an example.

A-CSI reporting timing may be determined based on an associated A-CSI-RS configuration. For example, such reporting timing may be determined based on an A-CSI-RS configuration index. As shown in exemplary A-CSI-RS configurations (or reuse patterns) 500 for 8Tx illustrated in FIG. 5, five A-CSI-RS configurations (e.g., configurations 501, 502, 503, 504, 505 shown in FIG. 5) may be used. A time location of an A-CSI-RS configuration may be used to determine a reporting time. n+k may be used as reporting timing where, for example, an A-CSI-RS configuration, such as exemplary A-CSI-RS Config. 501 shown in FIG. 5, may be indicated as an associated A-CSI-RS for A-CSI reporting. Alternatively, or in addition, n+k+1 may be used as reporting timing where, for example, associated A-CSI-RS configurations, such as exemplary A-CSI-RS Config. 502, A-CSI-RS Config. 503, and/or A-CSI-RS Config. 501 of FIG. 5, may be indicated as an associated A-CSI-RS for A-CSI reporting. Alternatively, or in addition, n+k+2 may be used as reporting timing where, for example, an associated A-CSI-RS configuration, such as exemplary A-CSI-RS Config. 505 of FIG. 5, may be indicated as an associated A-CSI-RS for A-CSI reporting.

A reporting time (e.g., n+k) for A-CSI may be used irrespective of associated CSI-RS properties. A CSI measurement search space may be restricted based on such associated CSI-RS properties for A-CSI reporting. A CSI measurement search space may include and/or indicate one or more CSI types that may be reported, a range of each of one or more CSI types, a parameter of each of one or more CSI types, and/or a value of each of one or more CSI types. One or more subsets of, or all of, such values and/or indicators may be associated with one another. More than one of multiple CSI types to report, multiple ranges of CSI types, multiple parameters of CSI types, and multiple values of CSI types may be included and/or indicated in a CSI measurement search space.

CSI types may include one or more of a wideband CQI, a subband CQI, an RI, a wideband PMI, a subband PMI, a precoding type indication (PTI), a CSI-RS Resource Indication (CRI), and/or a subband index. A range of a CSI type that may be related to CQI (e.g., wideband CQI, subband CQI) may be predefined or predetermined as a signal-to-noise ratio (SNR) range (e.g., a range from 0 to 15), where such an SNR range may be defined as/at a modulation and coding scheme (MCS) level. A range of a CSI type that may be related to PMI and/or RI (e.g., wideband CQI, subband CQI) may be determined based on a number of antenna ports that may be configured and/or a transmission mode and/or transmission scheme that may be configured. A parameter of a CSI type that may be related to subband reporting (e.g., subband CQI, subband PMI) may include a subband size for such reporting.

A CSI measurement search space may be restricted where an associated CSI-RS may be an A-CSI-RS. For example, RI may be restricted to a subset of candidates. Such an RI may be searched within full candidates of {1, 2, 3, 4} where A-CSI may be triggered based on a P-CSI-RS while RI may be searched within restricted candidates of {1, 2} where A-CSI may be triggered based on an A-CSI-RS. Restricted candidates of an RI may be determined based on an RI reporting value, such as a most recent RI reporting value. Restricted candidates of an RI may be configured via higher layer signaling. Restricted candidates of an RI may be indicated in an associated DCI that may trigger A-CSI reporting. For example, such restricted candidates of an RI may be a single candidate (e.g., {2}). A maximum RI value may be determined based on one or more CSI-RS types (e.g., P-CSI-RS, A-CSI-RS).

A number of CSI process may be limited. For example, Nc CSI processes may be configured via higher layer signaling. An eNodeB may trigger A-CSI reporting for such Nc CSI processes where one or more P-CSI-RSs may be used. A subset of Nc CSI processes may be used for A-CSI reporting when one or more A-CSI-RSs may be used. A single CSI process may be used (e.g., only used) for A-CSI reporting where A-CSI may be measured from an A-CSI-RS. A CSI process index for A-CSI reporting may be indicated in an associated DCI that may be used for A-CSI reporting.

PMI may be limited to a subset of candidates. For example, PMI candidates for A-CSI reporting with P-CSI-RS may be determined based on a codebook subset restriction that may be configured via higher layer signaling. PMI candidates for A-CSI reporting with an A-CSI-RS may be based on a subset of PMI candidates that may be determined for A-CSI reporting with a P-CSI-RS. For example, a two-stage codebook subset restriction may be used for A-CSI reporting with an A-CSI-RS. A first codebook subset restriction may be used for both a P-CSI-RS and an A-CSI-RS while a second codebook subset restriction may be used for an A-CSI-RS.

Where PMI may be limited to a subset of candidates, a first codebook subset restriction may be a superset of a second codebook subset restriction. Alternatively, or in addition, a first codebook subset restriction may be configured via higher layer signaling. Alternatively, or in addition, a second codebook subset restriction may be configured via higher layer signaling (e.g., separate signaling from that used to signal the first codebook subset restriction) that may be used for WTRUs that may be configured with an A-CSI-RS. Alternatively, or in addition, a second codebook subset restriction may be indicated dynamically from an associated DCI that may trigger A-CSI reporting with an A-CSI-RS.

PMI may be indicated in an associated DCI that may trigger A-CSI reporting with an A-CSI-RS. For example, a specific PMI may be indicated for use with A-CSI reporting. A WTRU may use the indicated specific PMI to search other CSI reporting indices (e.g., CQI, RI).

A subband size of subband CQI and/or a subband PMI reporting may be determined based on one or more CSI-RS types (e.g., P-CSI-RS, A-CSI-RS). For example, a first subband size may be used for subband CQI and/or subband PMI reporting where CSI reporting may be based on a P-CSI-RS. In such an example, a second subband size may be used for subband CQI and/or subband PMI reporting where CSI reporting may be based on an A-CSI-RS. Such a first subband size may be narrower than a second subband size, or vice versa. Such a second subband size may be multiples of such a first subband size. Alternatively, or in addition, such a second subband size may be indicated in a DCI that may trigger A-CSI reporting with an A-CSI-RS.

One or more subbands that may be used for CSI reporting may be limited where A-CSI reporting may be triggered based on an A-CSI-RS. For example, Ns subbands may be used for A-CSI reporting where a P-CSI-RS may be used for CSI measurement while Na subbands may be used for A-CSI reporting where an A-CSI-RS may be used for CSI measurement. Na may be smaller than Ns. Ns may be determined based on a system bandwidth. Na may be configured via higher layer signaling and/or predetermined. Ns may be indicated in a DCI that may trigger A-CSI reporting with an A-CSI-RS. A subband (e.g., a specific subband) may be indicated in a DCI that may trigger A-CSI reporting with an A-CSI-RS.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) for receiving a physical downlink shared channel (PDSCH) transmission, the WTRU comprising:
a processor, wherein the processor is configured to:
receive configuration information for a channel state information reference signal (CSI-RS), wherein the configuration information indicates one or more CSI-RS resources;
receive scheduling information for reception of the PDSCH transmission, wherein the scheduling information indicates PDSCH resources, wherein the PDSCH resources include a first number of resources and a second number of resources, and
wherein the first number of resources overlaps with at least a CSI-RS resource from the one or more CSI-RS resources; and
receive the PDSCH transmission using the first number of resources and the second number of resources when the CSI-RS is an aperiodic non-zero power CSI-RS (NZP-CSI-RS).

2. The WTRU of claim 1, wherein the processor is configured to receive the PDSCH transmission using the first number of resources and the second number of resources when the CSI-RS is the aperiodic NZP-CSI-RS by receiving the PDSCH transmission using at least a PDSCH modulation symbol, wherein the PDSCH modulation symbol maps to a PDSCH resource from the PDSCH resources.

3. The WTRU of claim 1, wherein the processor is further configured to receive the PDSCH transmission using the second number of resources when the CSI-RS is a periodic zero-power CSI-RS (ZP-CSI-RS), a periodic NZP-CSI-RS, or an aperiodic ZP-CSI-RS.

4. The WTRU of claim 3, wherein receiving the PDSCH transmission using the second number of resources when the CSI-RS is the periodic ZP-CSI-RS, the periodic NZP-CSI-RS, or the aperiodic ZP-CSI-RS, comprises receiving the PDSCH transmission using at least a PDSCH modulation symbol, wherein the PDSCH modulation symbol maps to a PDSCH resource from the second number of resources.

5. The WTRU of claim 1, wherein the PDSCH resources comprises a resource element.

6. The WTRU of claim 1, wherein the CSI-RS resource comprises a resource element.

7. A method performed by a wireless transmit/receive unit (WTRU) for receiving a physical downlink shared channel (PDSCH) transmission, the method comprising:
receiving configuration information for a channel state information reference signal (CSI-RS), wherein the configuration information indicates one or more CSI-RS resources;
receiving scheduling information for reception of the PDSCH transmission, wherein the scheduling information indicates PDSCH resources, wherein the PDSCH resources include a first number of resources and a second number of resources, and
wherein the first number of resources overlaps with at least a CSI-RS resource from the one or more CSI-RS resources; and
receiving the PDSCH transmission using the first number of resources and the second number of resources when the CSI-RS is an aperiodic non-zero power CSI-RS (NZP-CSI-RS).

8. The method of claim 7, wherein receiving the PDSCH transmission using the first number of resources and the second number of resources when the CSI-RS is the aperiodic NZP-CSI-RS comprises receiving the PDSCH transmission using at least a PDSCH modulation symbol, wherein the PDSCH modulation symbol maps to a PDSCH resource from the PDSCH resources.

9. The method of claim 7, wherein the method further comprises receiving the PDSCH transmission using the second number of resources when the CSI-RS is a periodic zero-power CSI-RS (ZP-CSI-RS), a periodic NZP-CSI-RS, or an aperiodic ZP-CSI-RS.

10. The method of claim 9, wherein receiving the PDSCH transmission using the second number of resources when the CSI-RS is the periodic ZP-CSI-RS, the periodic NZP-CSI-RS, or the aperiodic ZP-CSI-RS, comprises receiving the PDSCH transmission using at least a PDSCH modulation symbol, wherein the PDSCH modulation symbol maps to a PDSCH resource from the second number of resources.

11. The method of claim 7, wherein the PDSCH resources comprises a resource element.

12. The method of claim 7, wherein the CSI-RS resource comprises a resource element.

13. The method of claim 7, wherein the method further comprises sending an indication of a channel measurement to a network node, wherein the channel measurement is associated with the CSI-RS.

14. A wireless transmit/receive unit (WTRU) for receiving a physical downlink shared channel (PDSCH) transmission, the WTRU comprising:
a processor, wherein the processor is configured to:
receive configuration information for a channel state information reference signal (CSI-RS), wherein the configuration information indicates one or more CSI-RS resources;
receive scheduling information for reception of the PDSCH transmission, wherein the scheduling information indicates PDSCH resources, wherein the PDSCH resources include a first number of resources and a second number of resources, and
wherein the first number of resources overlaps with at least a CSI-RS resource from the one or more CSI-RS resources
receive the PDSCH transmission using the first number of resources and the second number of resources when the CSI-RS is an aperiodic non-zero power CSI-RS (NZP-CSI-RS); and
send an indication of a channel measurement to a network node, wherein the channel measurement is associated with the CSI-RS.

15. The WTRU of claim 14, wherein the processor is configured to receive the PDSCH transmission using the first number of resources and the second number of resources when the CSI-RS is the aperiodic NZP-CSI-RS by receiving the PDSCH transmission using at least a PDSCH modulation symbol, wherein the PDSCH modulation symbol maps to a PDSCH resource from the PDSCH resources.

16. The WTRU of claim 14, wherein the processor is further configured to receive the PDSCH transmission using the second number of resources when the CSI-RS is a periodic zero-power CSI-RS (ZP-CSI-RS), a periodic NZP-CSI-RS, or an aperiodic ZP-CSI-RS.

17. The WTRU of claim 16, wherein receiving the PDSCH transmission using the second number of resources when the CSI-RS is the periodic ZP-CSI-RS, the periodic NZP-CSI-RS, or the aperiodic ZP-CSI-RS, comprises receiving the PDSCH transmission using at least a PDSCH modulation symbol, wherein the PDSCH modulation symbol maps to a PDSCH resource from the second number of resources.

18. The WTRU of claim 14, wherein the PDSCH resources comprises a resource element.

19. The WTRU of claim 14, wherein the CSI-RS resource comprises a resource element.

\* \* \* \* \*